(12) United States Patent
Peterson et al.

(10) Patent No.: US 11,780,370 B2
(45) Date of Patent: *Oct. 10, 2023

(54) VEHICULAR DRIVER MONITORING SYSTEM WITH DMS CAMERA AT INTERIOR REARVIEW MIRROR ASSEMBLY

(71) Applicant: Magna Mirrors of America, Inc., Holland, MI (US)

(72) Inventors: Austen C. Peterson, Hudsonville, MI (US); Gregory A. Huizen, Hudsonville, MI (US)

(73) Assignee: Magna Mirrors of America, Inc., Holland, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 17/935,984

(22) Filed: Sep. 28, 2022

(65) Prior Publication Data

US 2023/0017715 A1    Jan. 19, 2023

Related U.S. Application Data

(63) Continuation of application No. 17/301,853, filed on Apr. 16, 2021, now Pat. No. 11,465,561.
(Continued)

(51) Int. Cl.
*B60R 1/02* (2006.01)
*B60R 1/12* (2006.01)

(52) U.S. Cl.
CPC ...... *B60R 1/025* (2013.01); *B60R 2001/1223* (2013.01); *B60R 2001/1253* (2013.01)

(58) Field of Classification Search
CPC ............ B60R 1/025; B60R 2001/1223; B60R 2001/1253; B60R 1/12; G08G 1/09623; G08G 1/166; G08B 21/06
See application file for complete search history.

(56) References Cited

U.S. PATENT DOCUMENTS 6,698,905 B1    3/2004  Whitehead
7,722,199 B2 *  5/2010  DeWard .................. B60R 1/04
                                                 359/872
(Continued)

FOREIGN PATENT DOCUMENTS

CN    205523966 U    8/2016
CN    209534893 U    10/2019
(Continued)

*Primary Examiner* — Howard D Brown, Jr.
*Assistant Examiner* — Tyler B Edwards
(74) *Attorney, Agent, or Firm* — HONIGMAN LLP

(57) ABSTRACT

A vehicular driver monitoring system includes an interior rearview mirror assembly having a mirror head adjustably attached at a mounting base configured to attach at an interior portion of a vehicle. A driver monitoring camera is accommodated by the mirror head so as to move in tandem with the mirror head when the mirror head is adjusted relative to the mounting base to adjust a driver's rearward view. At least one near infrared light emitter is accommodated by the mirror head and is operable to emit near infrared light toward a head region of the driver of the vehicle. Image data captured by the driver monitoring camera is processed to determine driver attentiveness and/or driver drowsiness. The vehicular driver monitoring system adjusts processing of the captured image data to accommodate adjustment of the mirror head when the driver adjusts the mirror head to adjust his or her rearward view.

41 Claims, 22 Drawing Sheets

Related U.S. Application Data

(60) Provisional application No. 62/706,707, filed on Sep. 4, 2020, provisional application No. 63/011,360, filed on Apr. 17, 2020.

(56) References Cited

U.S. PATENT DOCUMENTS

| | | | |
|---|---|---|---|
| 7,914,187 | B2 | 3/2011 | Diggins-Luthman et al. |
| 9,405,120 | B2 | 8/2016 | Graf et al. |
| 9,609,757 | B2 | 3/2017 | Steigerwald |
| 9,616,815 | B2 | 4/2017 | Mohan |
| 9,878,669 | B2 | 1/2018 | Kendall |
| 9,900,490 | B2 | 2/2018 | Ihlenburg et al. |
| 10,017,114 | B2 | 7/2018 | Bongwald |
| 10,046,706 | B2 | 8/2018 | Larson et al. |
| 10,065,574 | B2 | 9/2018 | Tiryaki |
| 10,166,924 | B2 | 1/2019 | Baur |
| 10,264,219 | B2 | 4/2019 | Mleczko et al. |
| 10,421,404 | B2 | 9/2019 | Larson et al. |
| 10,442,360 | B2 | 10/2019 | LaCross et al. |
| 10,466,563 | B2 | 11/2019 | Kendall et al. |
| 11,465,561 | B2 * | 10/2022 | Peterson ................. B60R 1/025 |
| 2010/0020170 | A1 * | 1/2010 | Higgins-Luthman ........................ B60W 30/16 348/135 |
| 2010/0253526 | A1 * | 10/2010 | Szczerba ................. G08B 21/06 340/576 |
| 2011/0080481 | A1 | 4/2011 | Bellingham |
| 2014/0285666 | A1 | 9/2014 | O'Connell et al. |
| 2014/0336876 | A1 | 11/2014 | Gieseke et al. |
| 2015/0009010 | A1 | 1/2015 | Biemer |
| 2015/0015710 | A1 | 1/2015 | Tiryaki |
| 2015/0022664 | A1 | 1/2015 | Pflug et al. |
| 2015/0092042 | A1 | 4/2015 | Fursich |
| 2015/0232030 | A1 | 8/2015 | Bongwald |
| 2015/0294169 | A1 | 10/2015 | Zhou et al. |
| 2015/0296135 | A1 | 10/2015 | Wacquant et al. |
| 2015/0352953 | A1 | 12/2015 | Koravadi |
| 2016/0137126 | A1 | 5/2016 | Fursich et al. |
| 2016/0209647 | A1 | 7/2016 | Fursich |
| 2017/0217367 | A1 | 8/2017 | Pflug et al. |
| 2017/0274906 | A1 | 9/2017 | Hassan et al. |
| 2017/0355312 | A1 | 12/2017 | Habibi et al. |
| 2018/0134217 | A1 | 5/2018 | Peterson et al. |
| 2018/0231976 | A1 | 8/2018 | Singh |
| 2019/0118717 | A1 | 4/2019 | Blank et al. |
| 2019/0146297 | A1 | 5/2019 | Lynam et al. |
| 2019/0258131 | A9 | 8/2019 | Lynam et al. |
| 2019/0381938 | A1 | 12/2019 | Hopkins |
| 2020/0143560 | A1 | 5/2020 | Lu et al. |
| 2020/0202151 | A1 | 6/2020 | Wacquant |
| 2020/0377022 | A1 | 12/2020 | LaCross et al. |
| 2021/0155167 | A1 | 5/2021 | Lynam et al. |
| 2021/0162926 | A1 | 6/2021 | Lu |
| 2021/0245662 | A1 | 8/2021 | Blank et al. |
| 2021/0291739 | A1 | 9/2021 | Kasarla et al. |

FOREIGN PATENT DOCUMENTS

| | | |
|---|---|---|
| DE | 10325646 A1 | 1/2004 |
| DE | 102005000650 A1 | 7/2006 |

\* cited by examiner

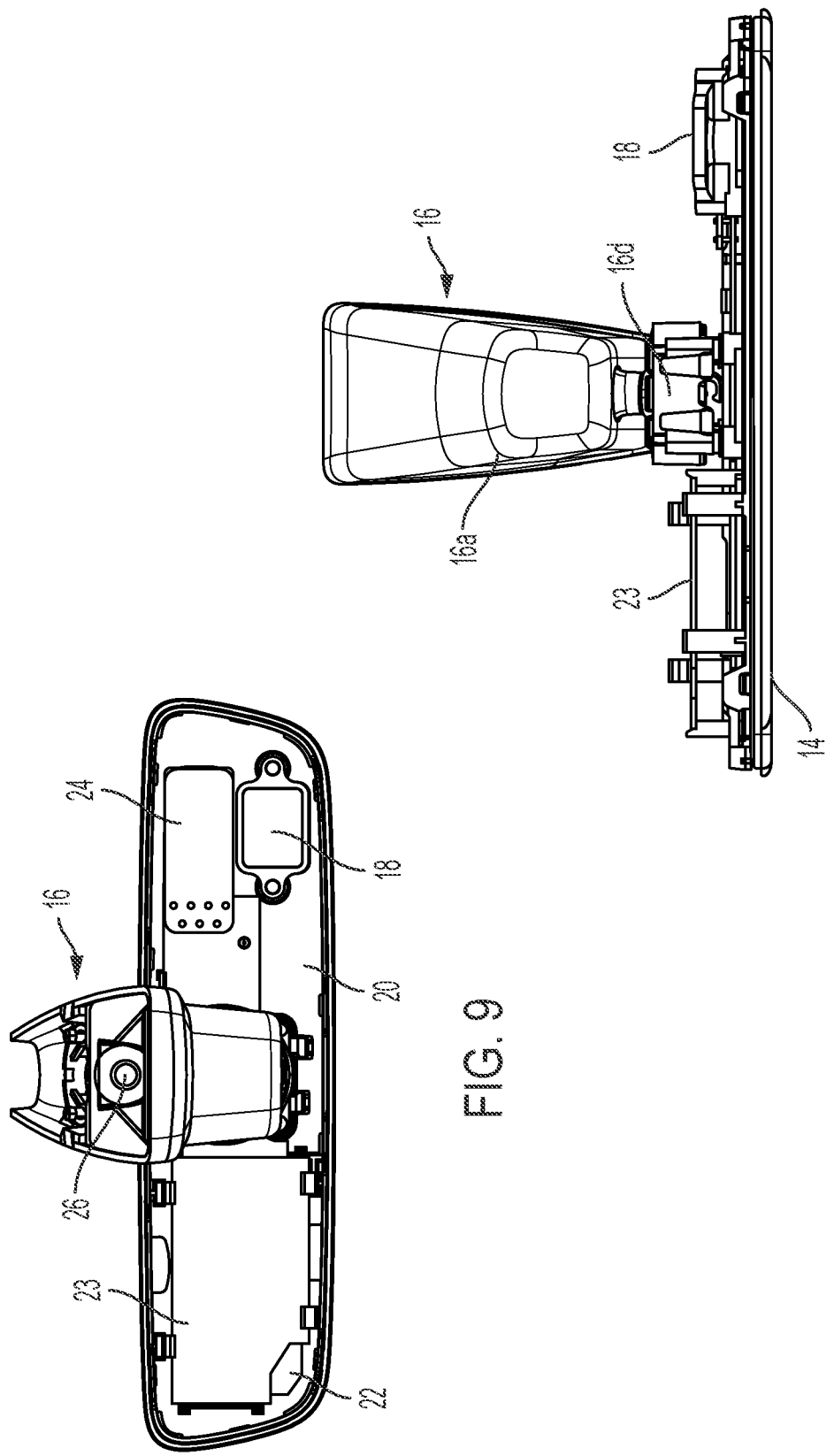

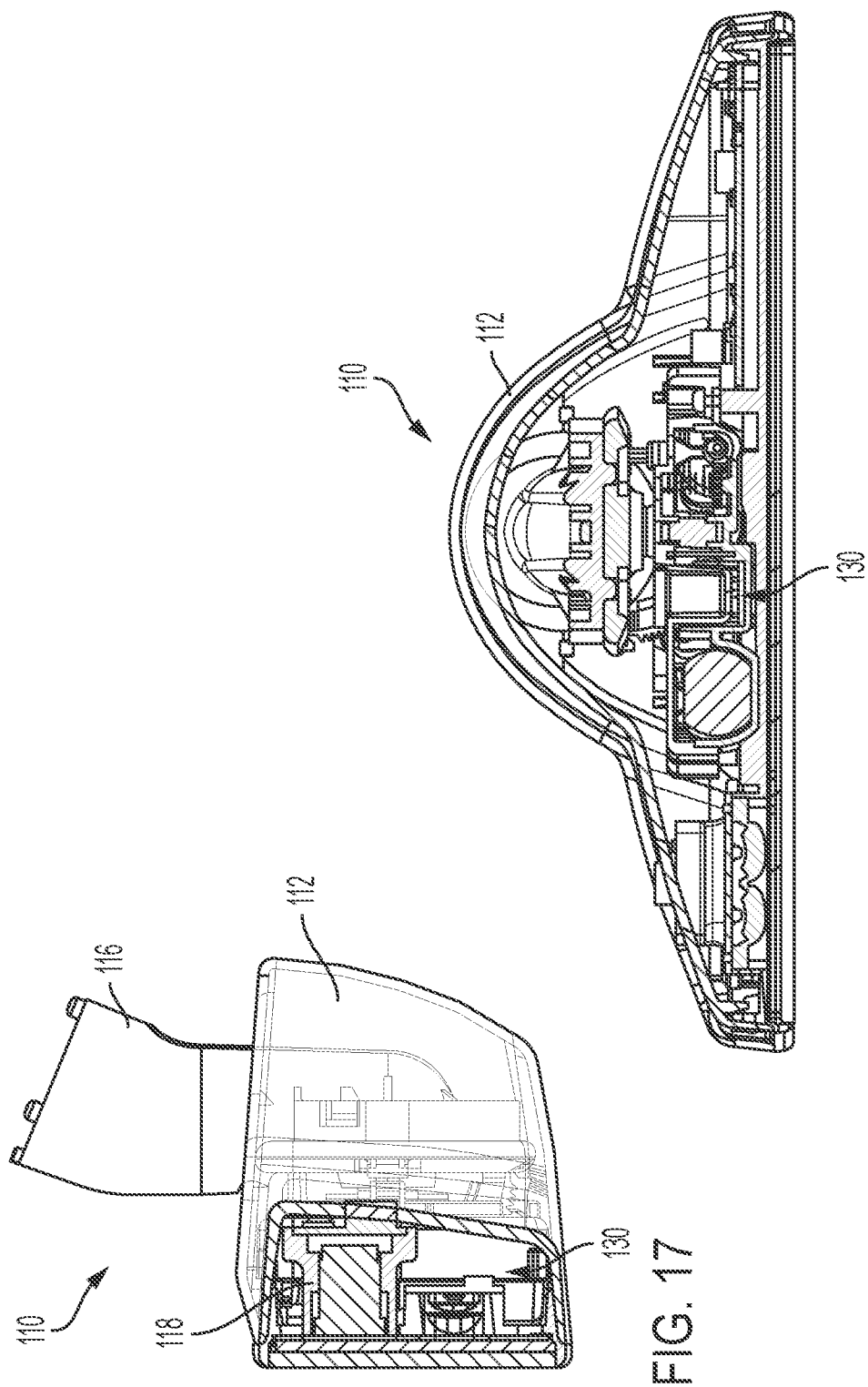

US 11,780,370 B2

VEHICULAR DRIVER MONITORING SYSTEM WITH DMS CAMERA AT INTERIOR REARVIEW MIRROR ASSEMBLY

CROSS REFERENCE TO RELATED APPLICATIONS

The present application is a continuation of U.S. patent application Ser. No. 17/301,853, filed Apr. 16, 2021, now U.S. Pat. No. 11,465,561, which claims the filing benefits of U.S. provisional application Ser. No. 62/706,707, filed Sep. 4, 2020, and U.S. provisional application Ser. No. 63/011,360, filed Apr. 17, 2020, which are hereby incorporated herein by reference in their entireties.

FIELD OF THE INVENTION

The present invention relates generally to the field of interior rearview mirror assemblies for vehicles.

BACKGROUND OF THE INVENTION

It is known to provide a mirror assembly that is adjustably mounted to an interior portion of a vehicle, such as via a double ball pivot or joint mounting configuration where the mirror casing and reflective element are adjusted relative to the interior portion of a vehicle by pivotal movement about the double ball pivot configuration. The mirror casing and reflective element are pivotable about either or both of the ball pivot joints by a user that is adjusting a rearward field of view of the reflective element.

SUMMARY OF THE INVENTION

The present invention provides an interior rearview mirror assembly that has a driver monitoring camera disposed at the mirror head so as to move in tandem with the mirror head when the mirror head is adjusted relative to an interior portion of the vehicle to adjust the driver's rearward view. The mirror assembly also comprises a forward viewing camera disposed at the mounting structure (that mounts the mirror head at the vehicle) so as to have a forward field of view through the windshield of the vehicle. A first processor is operable to process image data captured by the driver monitoring camera to determine at least one selected from the group consisting of (i) driver attentiveness, (ii) driver drowsiness and (iii) driver gaze direction. A second processor is operable to process image data captured by the forward viewing camera to determine driving conditions and/or potential hazards ahead of the vehicle. The first processor, responsive to processing of image data captured by the driver monitoring camera, adjusts processing of the image data captured by the driver monitoring camera to accommodate adjustment of the mirror head when the driver adjusts the mirror head to adjust his or her rearward view. The first processor and the second processor may comprise the same image processor (i.e., the processors may comprise a common image processor) that is operable to process image data captured by the driver monitoring camera and the forward viewing camera.

These and other objects, advantages, purposes and features of the present invention will become apparent upon review of the following specification in conjunction with the drawings.

BRIEF DESCRIPTION OF THE DRAWINGS

FIG. 9 is a rear plan view of the interior rearview mirror assembly, shown with the mirror casing removed;

FIG. 10 is a bottom view of the interior rearview mirror assembly of FIG. 9;

FIG. 17 is a side elevation and partial sectional view of the interior rearview mirror assembly;

FIG. 18 is a bottom view and partial sectional view of the interior rearview mirror assembly;

DESCRIPTION OF THE PREFERRED EMBODIMENTS

Figure 1:
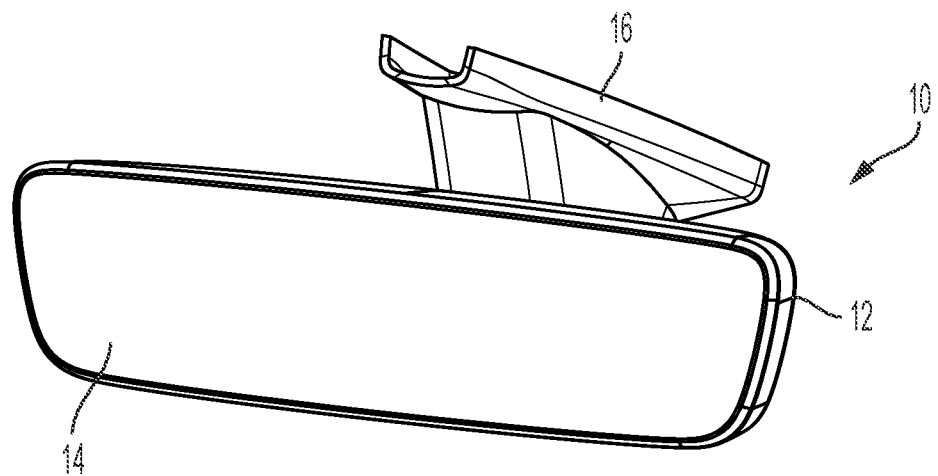
FIG. 1 is a perspective view of an interior rearview mirror assembly in accordance with the present invention.
Figure 2:
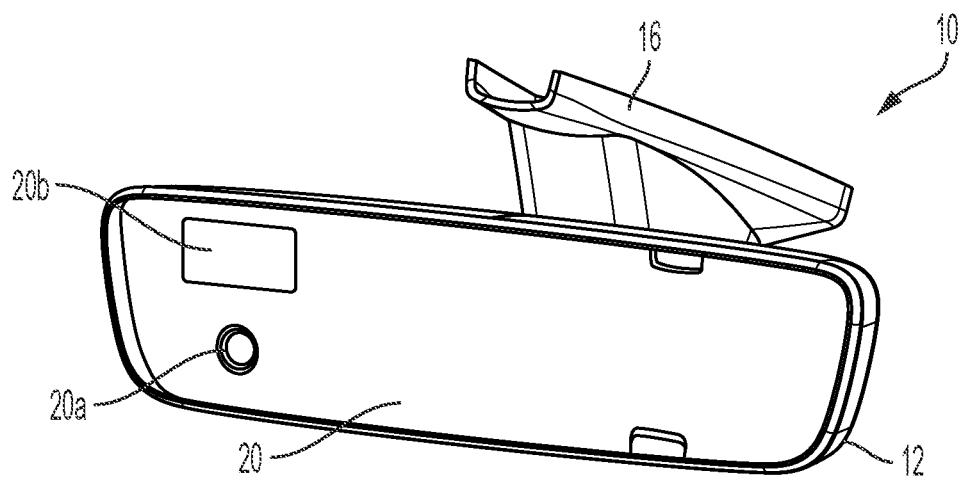
FIG. 2 is another perspective view of the interior rearview mirror assembly, shown with the reflective element removed.
Figure 3:
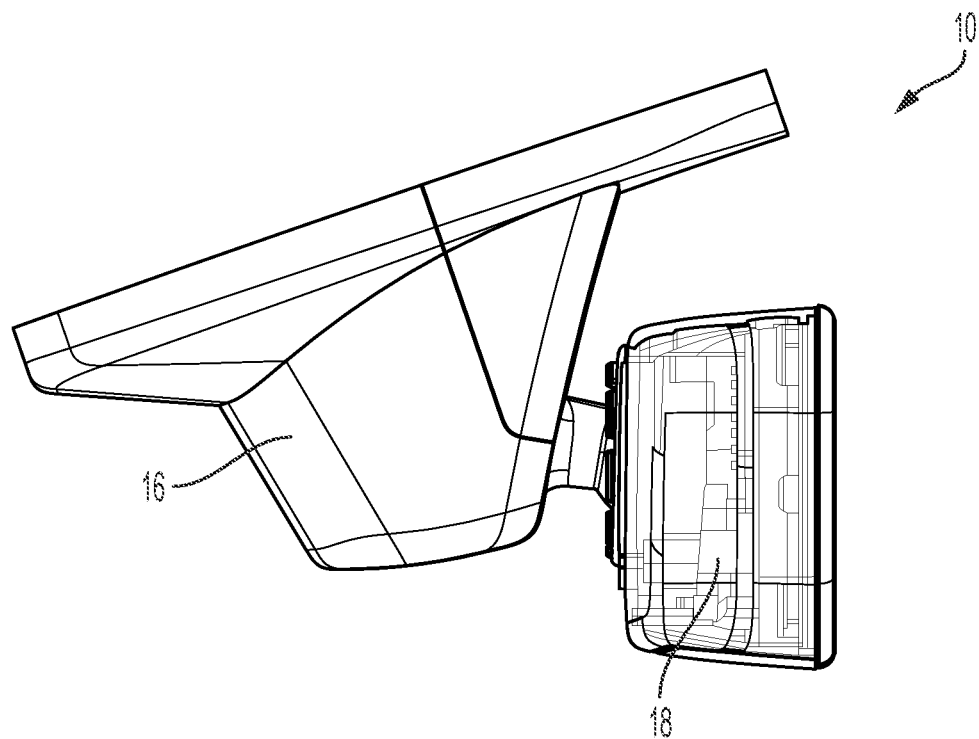
FIG. 3 is a side elevation of the interior rearview mirror assembly.
Figure 4:
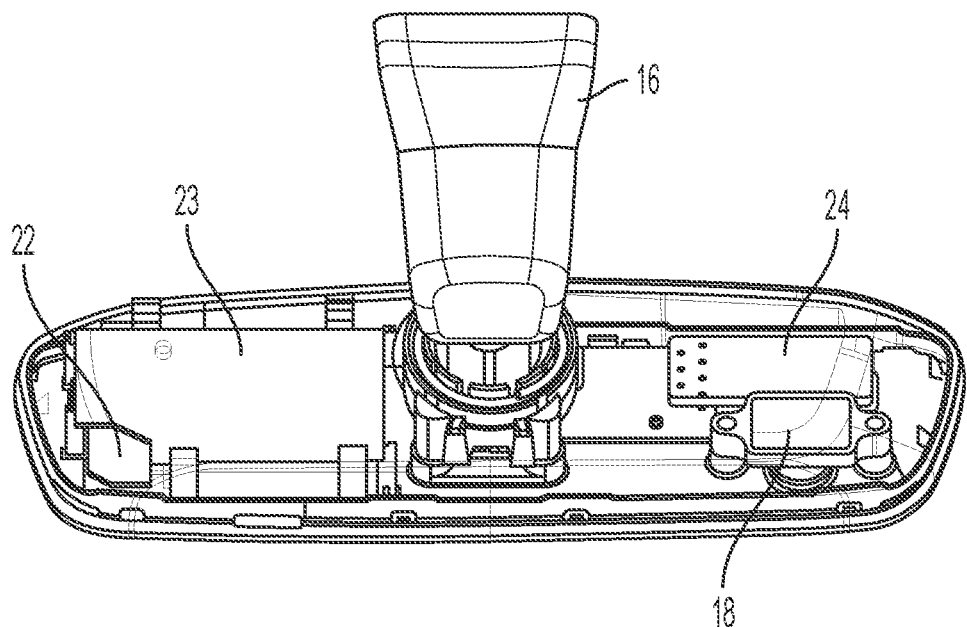
FIG. 4 is a rear perspective view of the interior rearview mirror assembly.
Figure 5:
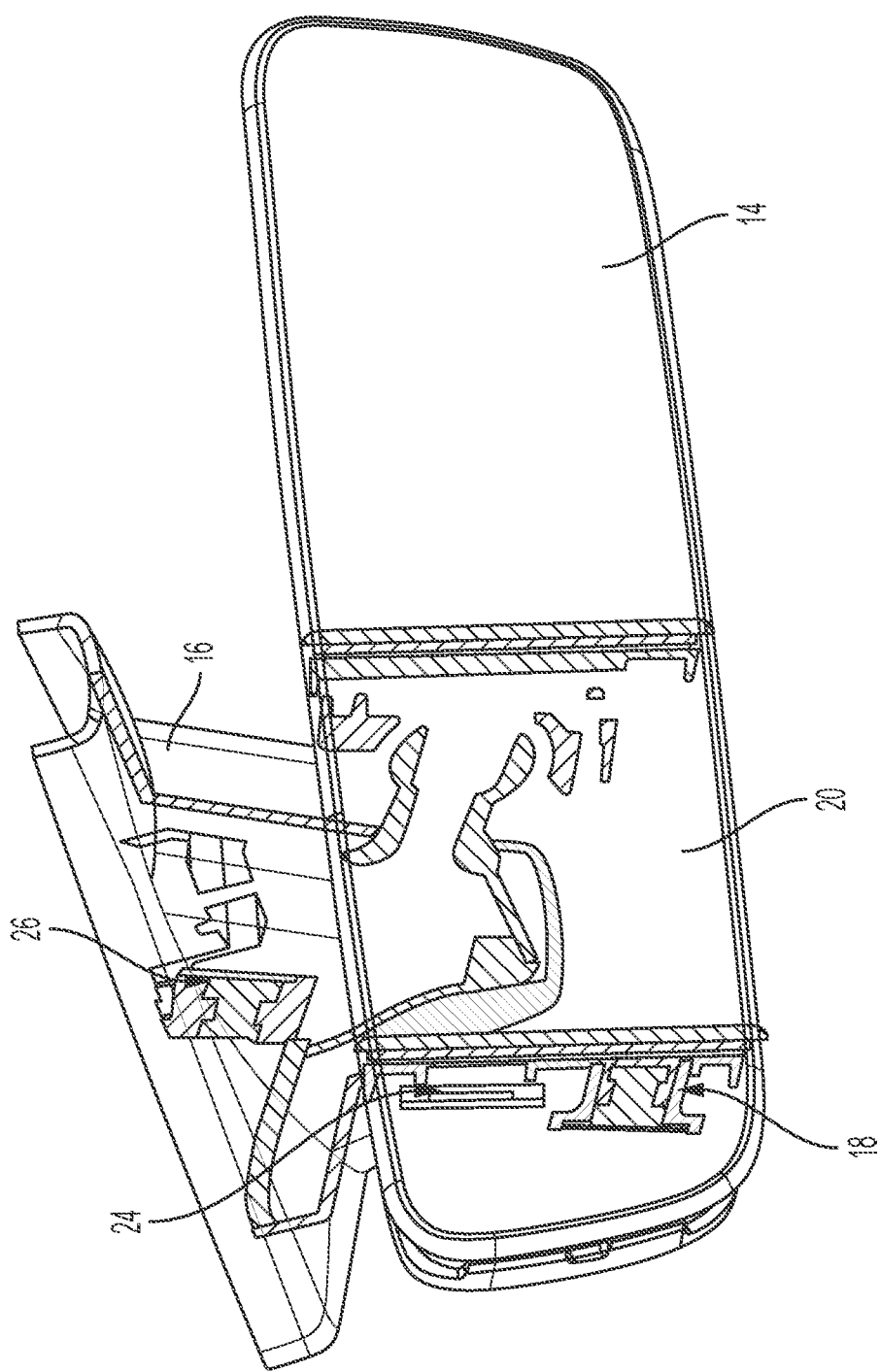
FIG. 5 is a perspective and partial sectional view of the interior rearview mirror assembly.
Figure 6:
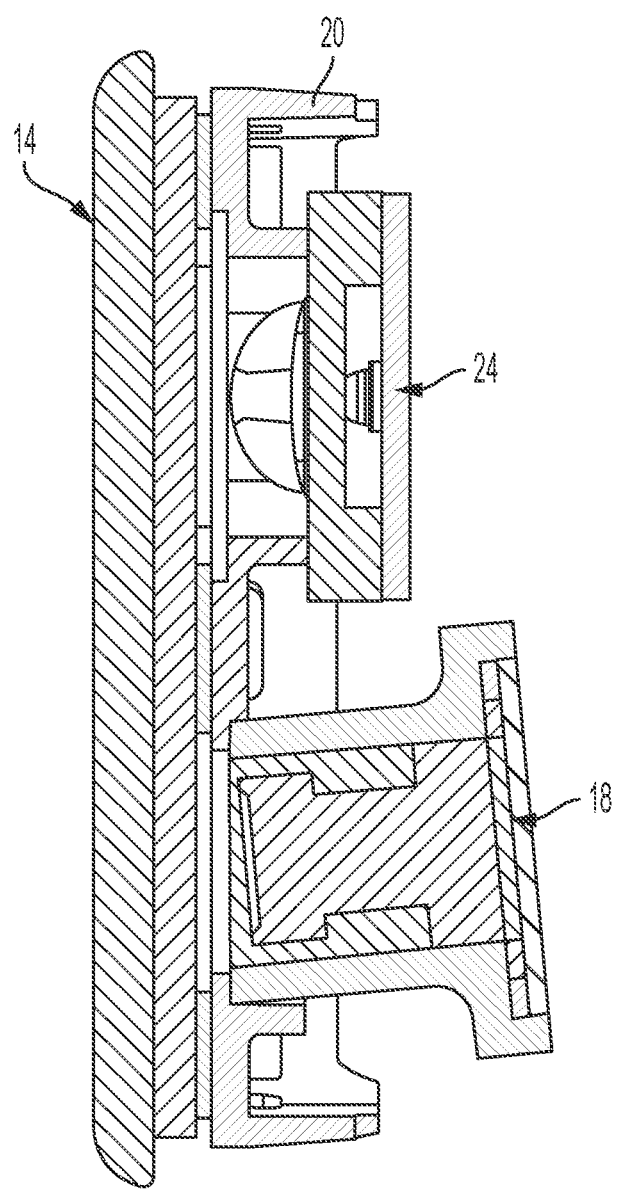
FIG. 6 is a sectional view of the interior rearview mirror assembly, with the casing and mounting structure removed.
Figure 7:
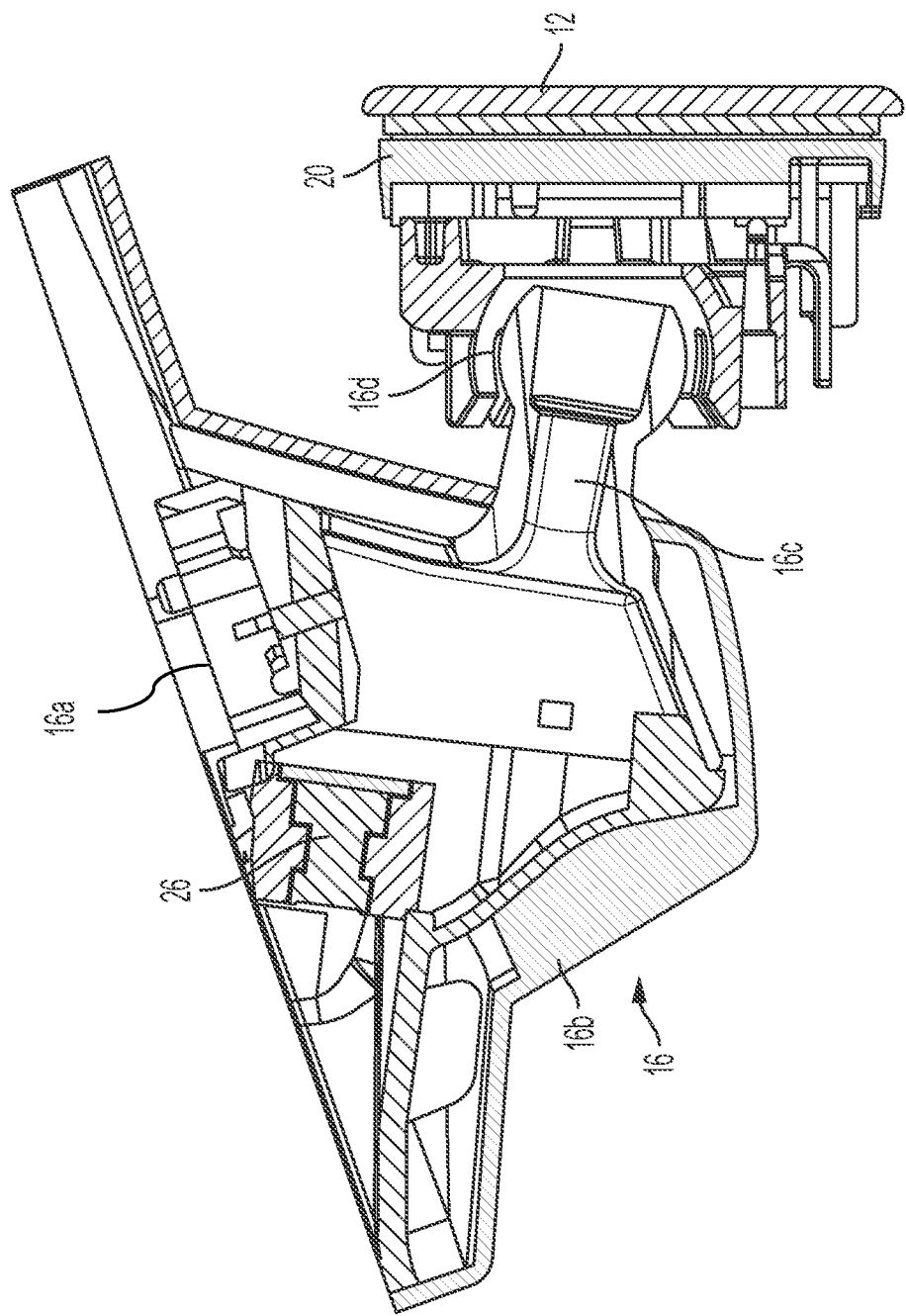
FIG. 7 is a sectional view of the interior rearview mirror assembly.

Referring now to the drawings and the illustrative embodiments depicted therein, an interior rearview mirror assembly 10 for a vehicle includes a casing 12 and a reflective element 14 positioned at a front portion of the casing 12 (FIG. 1). In the illustrated embodiment, mirror assembly 10 is configured to be adjustably mounted to an interior portion of a vehicle (such as to an interior or in-cabin surface of a vehicle windshield or a headliner of a vehicle or the like) via a mounting structure or mounting configuration or assembly 16. The mirror reflective element comprises a variable reflectance mirror reflective element that varies its reflectance responsive to electrical current applied to conductive coatings or layers of the reflective element.

As shown in FIGS. 3-6 and 8-10, the mirror assembly includes a driver monitoring system (DMS) comprising a driver monitoring camera 18 disposed at a back plate 20 (and viewing through an aperture 20a of the back plate) behind the reflective element 14 and viewing through the reflective element toward a head region of the driver of the vehicle. The mirror assembly includes a printed circuit board (PCB) 22 having a control or control unit comprising electronic circuitry (disposed at the circuit board or substrate in the mirror casing), which includes driver circuitry for controlling dimming of the mirror reflective element. The mirror assembly also includes a DMS circuit board 23, which includes a processor that processes image data captured by the camera 18 for monitoring the driver and determining, for example, driver attentiveness and/or driver drowsiness. The driver monitoring system includes the driver monitoring camera and may also include an occupant monitoring camera (or the driver monitoring camera may view the occupant or passenger seat of the vehicle as well as the driver region), and may provide occupant detection and/or monitoring functions as part of an occupant monitoring system (OMS).

The system may process image data captured by the camera (and optionally may process outputs of one or more other sensors) to determine various driver features. For example, the system may determine any one or more (and any combination) of the following features: (i) driver's (or occupant's) head found, (ii) abnormal head posture, (iii) detection of a fake head at the driver seat/region or at the passenger seat/region, (iv) driver's (or occupant's) eyes closed, (v) driver's eyes off the road ahead of the vehicle, (vi) driver's position in the driver seat (and/or occupant's position in the passenger seat), (vii) driver viewing a target, (viii) microsleep, (ix) driver (or occupant) sleeping, (x) driver (or occupant) drowsiness level, (xi) driver hand position category (such as by utilizing aspects of the systems described in U.S. Publication No. US-2018-0231976, which is hereby incorporated herein by reference in its entirety), (xii) driver held object classification, (xiii) driver's (or occupant's) head nodding, (xiv) driver (or occupant) speaking, (xv) driver (or occupant) laughing, (xvi) driver (or occupant) coughing, (xvii) driver (or occupant) sneezing, (xviii) driver (or occupant) yawning, (xix) driver's (or occupant's) body turning, (xx) driver (or occupant) smoking, (xxi) driver (or occupant) holding phone at head, (xxii) change in driver (or occupant), (xxiii) face identification, (xxiv) presence of an occupant, (xxv) presence of a child, (xxvi) presence of a child seat, (xxvii) driver (or occupant) video conferencing, and/or (xxviii) driver (or occupant) taking a selfie.

Figure 8:
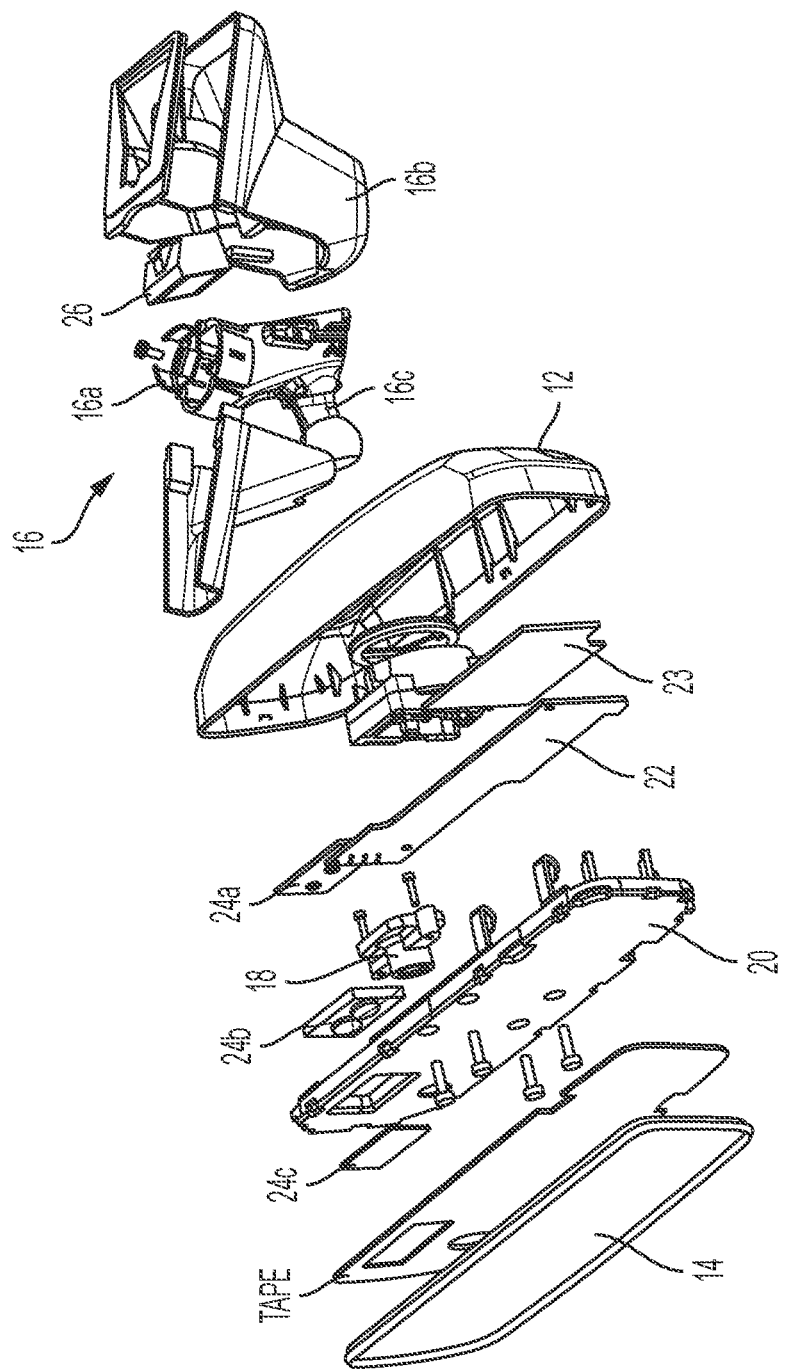
FIG. 8 is an exploded perspective view of the interior rearview mirror assembly.

The mirror assembly may also include one or more infrared (IR) or near infrared light emitters 24 (such as IR or near-IR light emitting diodes (LEDs) or vertical-cavity surface-emitting lasers (VCSEL) or the like) disposed at the back plate 20 behind the reflective element 14 and emitting near infrared light through an aperture 20b of the back plate and through the reflective element toward the head region of the driver of the vehicle. As shown in FIG. 8, the IR emitter device 24 comprises an IR emitter or LED printed circuit board 24a, a lens array optic 24b and a longpass IR filter 24c (or IR bandpass filter). The PCB 22 includes circuitry for controlling the IR emitters 24.

As shown in FIGS. 5 and 7-9, a forward viewing camera 26 is disposed at the mirror stay or mounting assembly 16 so as to view through the windshield and forward of the vehicle when the mirror assembly is mounted at the in-cabin side of the vehicle windshield. An image processor (e.g., the same processor that processes image data captured by the driver monitoring camera or a separate and distinct processor accommodated by the mirror assembly or disposed elsewhere in the vehicle) processes image data captured by the forward viewing camera, such as for a driving assist system of the vehicle (e.g., a pedestrian detection system, a collision avoidance or collision mitigation system, a headlamp control system, a traffic sign recognition system, a lane keep assist system and/or the like) and/or for determining driving conditions and/or potential hazards ahead of the vehicle.

The DMS PCB 23 receives an input from the driver monitoring camera 18, such as via a coaxial cable or connection, and also receives an input from the forward viewing camera 26, such as via a coaxial cable or connection. The mirror control PCB 22 is electrically connected to the DMS PCB 23, such as via a multi-pin connector or flexible ribbon cable or the like, and the mirror control PCB is electrically connected to the vehicle wire harness via a multi-pin connector or plug and socket type connector or the like. The IR LED PCB 24a is electrically connected to the mirror control PCB 22 via mechanical attachment of the PCB 24a at the PCB 22, such as via solderless compliant pins or spring-loaded connectors or pins or the like (such as by utilizing aspects of the electrical connections described in U.S. Pat. Nos. 10,466,563, 9,878,669, which are hereby incorporated herein by reference in their entireties).

The interior rearview mirror has embedded cameras, IR illuminators and the processor for processing captured image data for the driver monitoring application. The inward facing camera 18 and IR illuminators 24 are fixed within the mirror head, and thus both components are coupled with the mirror body. Hence, the camera's field of view is subject to change from driver to driver as the mirror head is adjusted to set the driver's preferred rearward view. The forward or outward facing camera 26 is fixed within the mirror mount and cover, and thus the field of view of the camera 26 is not subject to change based on adjustment by the driver.

The processor is disposed within or accommodated by the mirror head and processes the camera inputs to detect and inform the driver of distractions or other valuable information. For example, the processor may determine driver attentiveness and/or driver gaze direction (via processing of image data captured by the driver monitoring camera) and, responsive to determination of a hazard ahead of the vehicle (via processing of image data captured by the forward viewing camera) and at a region not being viewed by the driver at that time, the system may generate an alert to the driver to inform the driver of the potential hazard that requires his or her attention. The alert may comprise an audible alert or haptic alert or visual alert (such as a warning indicator or display of the detected hazard at a video display screen or heads up display of the vehicle).

The electro-optic (such as electrochromic (EC)) mirror reflective element sub-assembly transmits near infrared light and reflects visible light. Thus, the mirror reflective element (i.e., a transflective mirror reflector of the mirror reflective element) effectively allows the IR emitters to emit light through the reflective element and allows the camera to 'view' through the mirror reflective element, while allowing the mirror reflective element to reflect at least some visible light incident thereat to serve its intended rear viewing purpose. The IR emitters may be activated responsive at least in part to an ambient light level within the vehicle cabin and at the driver's head region, with the light level being determined by a light sensor or by processing of image data captured by the driver monitoring camera.

The outward or forward viewing camera 26 is disposed at or near the in-cabin side of the windshield and at or near an attachment portion 16a of the mounting assembly 16 that attaches the mount or stay at the in-cabin side of the windshield. A cover or housing 16b surrounds the mount and camera at the in-cabin side of the windshield to conceal the components from a person viewing the mirror assembly from within the vehicle and to protect the camera from light pollution. Electrical wires for the circuitry and camera are routed within the cover and may pass through the mounting arm 16c and pivot joint 16d (such as a ball member of the arm received in a socket element at the mirror head) to electrically connect to the circuit board 22.

Figure 11:
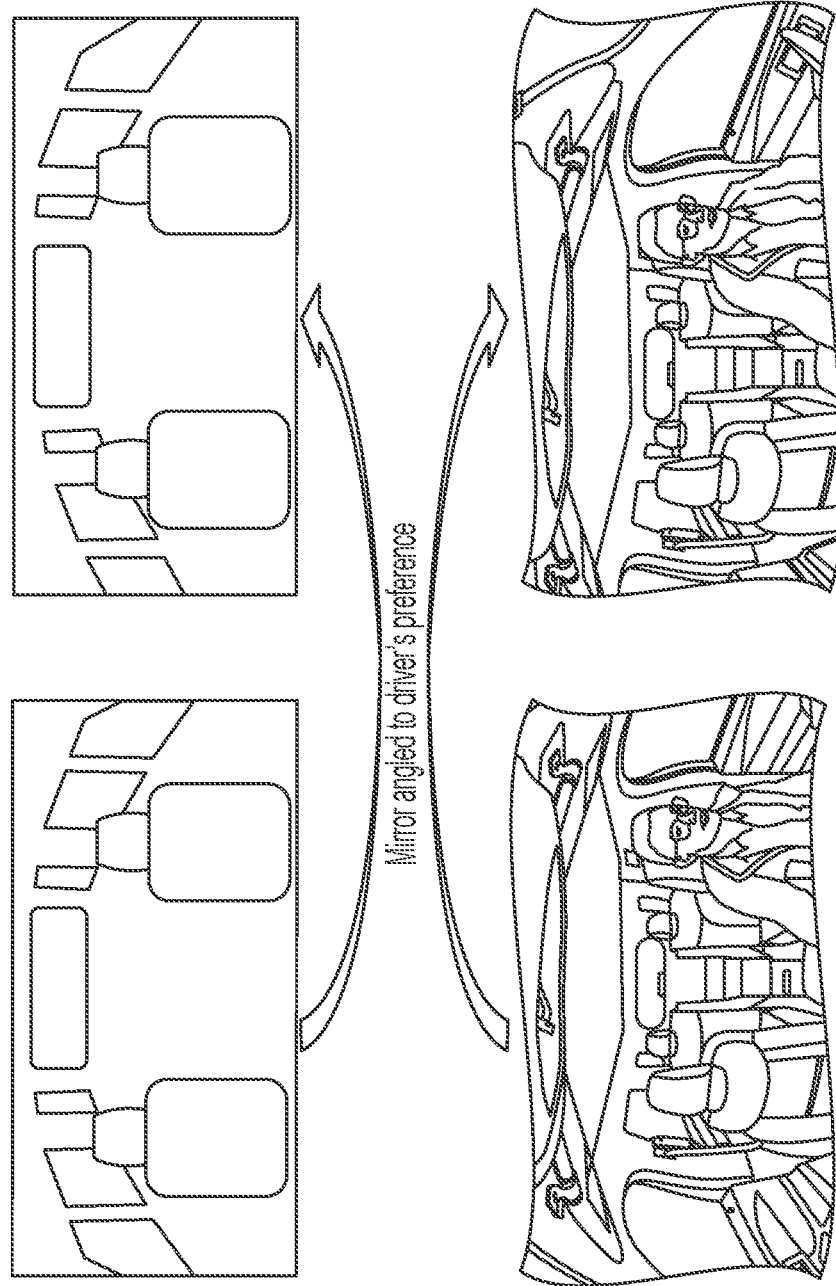
FIG. 11 shows different views of how the field of view of the mirror camera may change when the mirror reflective element is adjusted by the driver of the vehicle.
Figure 12:
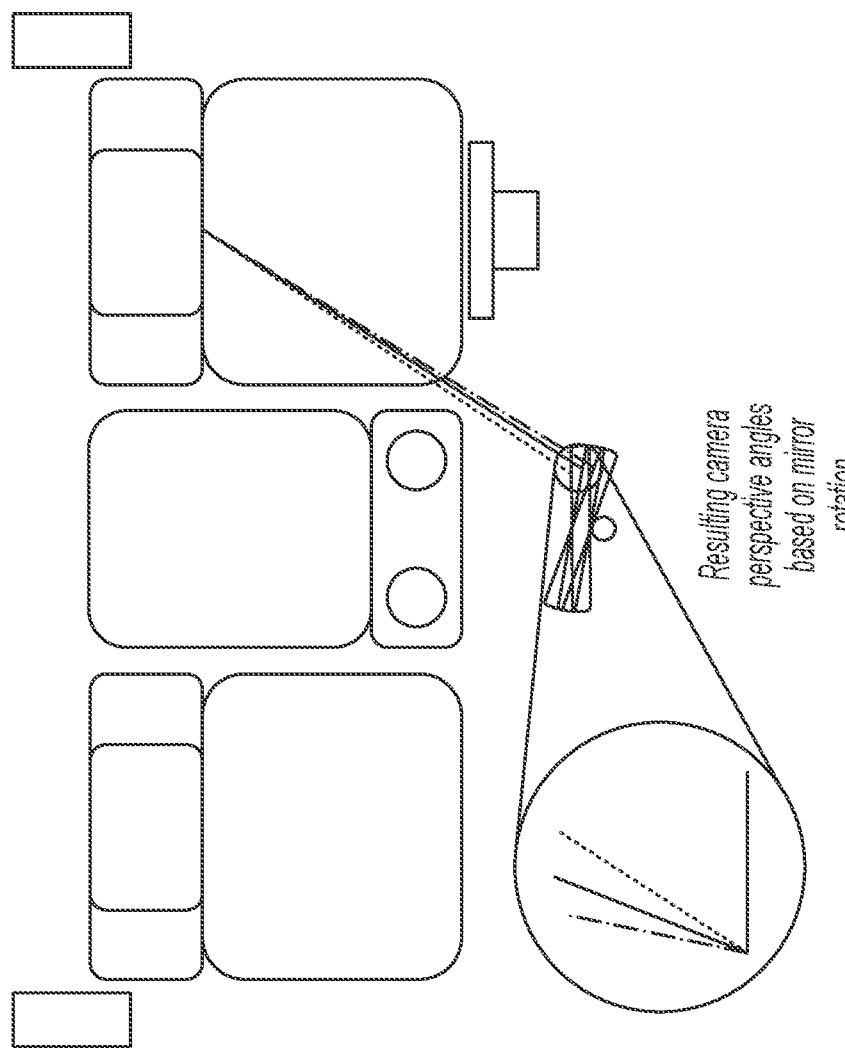
FIG. 12 is a plan view of the vehicle showing different positions of the mirror reflective element.

Having the inward viewing driver monitoring camera 18 in a pivotable rearview mirror head poses unique challenges pertaining to the camera's perspective. In order to account for changes in the camera's view when the mirror head is adjusted, the mirror's driver monitoring processor calculates the camera's location and angle within the vehicle based on the image data captured by the camera and processed by the processor. For example, the system may process image data captured by the driver monitoring camera 18 to determine where particular features are located in the field of view of the camera (such as relative to a particular area of the field of view, such as a central region), and thus the driver monitoring system determines the position of the driver's head by the determined position or positions of particular fixed vehicle features, such as the rear windows, pillars, center console or the like, in the captured image data (see FIGS. 11 and 12). The system may adjust processing of the image data captured by the camera 18 to accommodate changes in location of the known or particular vehicle features. For example, if a nominal setting of the mirror has a particular feature a predetermined distance laterally and/or vertically from a center of the image data, if it is determined that the particular feature is shifted or offset to one side or the other from the predetermined distance location, the processor shifts or adjusts processing of captured image data to accommodate the lateral and/or vertical shift of the particular feature.

The adjustment in processing can be done in software or it can be done with an inertial measurement unit (IMU), such as one or more accelerometers, gyroscopes, etc., or other sensor to measure mirror head movement. The mirror rearward view adjustment can range +/−30 degrees horizontally, while adjustment accommodation angles for 5th to 95th percentile drivers would typically range within 20 degrees of one another. In other words, the average horizontal adjustment difference from a 5th to 95th percentile driver is less than 20 degrees, even though the mirror itself allows for larger horizontal adjustment of +/−30 degrees. The DMS/OMS software accounts for the smaller accommodation angle range.

Figure 13:
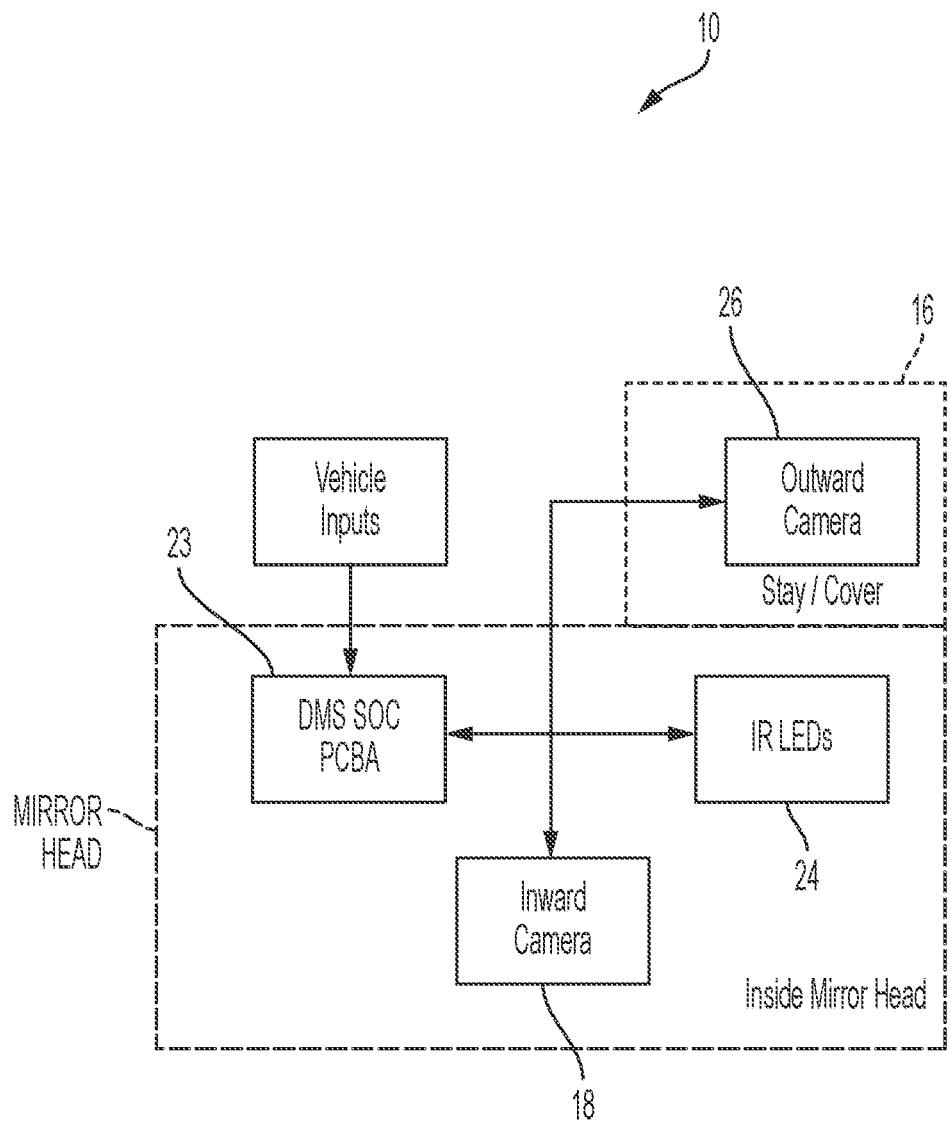
FIG. 13 is a block diagram of the driver monitoring system at the interior rearview mirror assembly.
Figure 14:
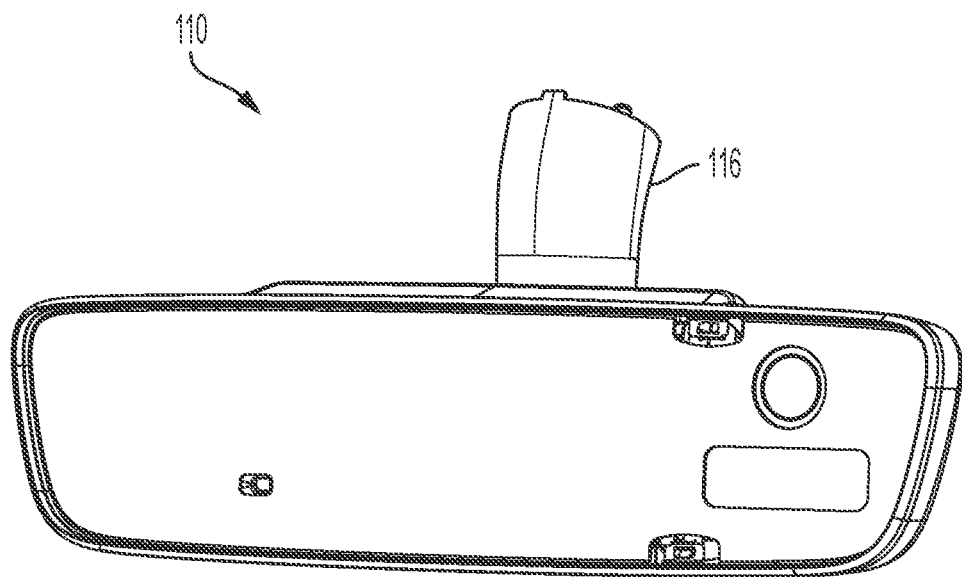
FIG. 14 is a perspective view of another interior rearview mirror assembly, shown with the reflective element removed.
Figure 15:
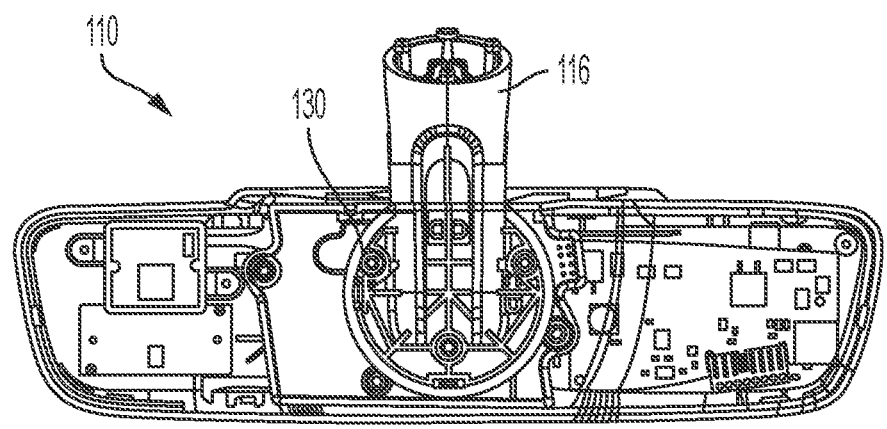
FIG. 15 is a rear perspective view of the interior rearview mirror assembly.

Thus, and as shown in FIG. 13, the system has the DMS PCB 23, the near IR emitters 24 and the DMS camera 18 disposed inside the mirror head of the mirror assembly 10. The DMS PCB 23 receives vehicle inputs from the vehicle (such as via the Local Interconnect Network (LIN) bus of the vehicle and/or the Controller Area Network (CAN) bus of the vehicle). The DMS PCB also receives an input from the outward or forward viewing camera 26 disposed at the mounting assembly or mirror stay or base portion or cover 16 of the mirror assembly 10. The DMS PCB also provides control signals to the cameras 18, 26 and the near IR emitters 24 to activate and deactivate and to control operation of the cameras and LEDs.

The driver monitoring system, including the cameras and processor, may utilize aspects of the systems described in U.S. Pat. Nos. 10,065,574; 10,017,114; 9,405,120 and/or 7,914,187, and/or U.S. Publication Nos. US-2020-0202151; US-2020-0143560; US-2017-0274906; US-2017-0217367; US-2016-0209647; US-2016-0137126; US-2015-0352953; US-2015-0296135; US-2015-0294169; US-2015-0232030; US-2015-0092042; US-2015-0022664; US-2015-0015710; US-2015-0009010 and/or US-2014-0336876, and/or U.S. patent application Ser. No. 17/249,937, filed Mar. 19, 2021, and/or U.S. provisional application Ser. No. 63/200,451, filed Mar. 8, 2021, and/or U.S. provisional application Ser. No. 63/200,315, filed Mar. 1, 2021, and/or U.S. provisional application Ser. No. 63/200,003, filed Feb. 9, 2021, and/or U.S. provisional application Ser. No. 63/199,918, filed Feb. 3, 2021, and/or U.S. provisional application Ser. No. 63/198,372, filed Oct. 14, 2020, which are all hereby incorporated herein by reference in their entireties.

Optionally, the mirror assembly may include a memory actuator that positions the mirror head at a preselected orientation responsive to determination of a particular driver of the vehicle (or responsive to a user input, such as similar to a memory seat setting and feature). When combining a memory actuator and DMS in the interior rearview mirror assembly, algorithms may physically calibrate or optimize the mirror head position (and thus the mirror reflection that the driver would see at the mirror reflective element) relative to the driver's specific eye points. By doing this, the driver monitoring camera's field of view would also be optimized by such positioning of the driver's face/head in a common zone within the camera's imager. The camera would be fixed to the mirror head (thus when the mirror angle is adjusted, so is the camera), and the algorithm would detect the position of the driver's face in the image data captured by the camera and then, based on that position information, the controller or ECU could drive the memory actuator to a new position with feedback from the memory system in the actuator.

For example, and with reference to FIGS. 14-18, the mirror assembly 110 includes the driver monitoring camera 118 and an electrically powered actuator 130, which is operable to adjust the mirror head relative to the mounting structure or base 116 responsive to processing of image data captured by the DMS camera 118. FIGS. 14-18 show a mirror assembly similar to the mirror assembly of FIGS. 1-10, but with the camera and light source disposed at the opposite side of the mirror head and with an electrically powered mirror actuator for adjusting the mirror head and/or reflective element.

As shown in FIGS. 14-18, the mirror assembly 110 includes a driver monitoring system (DMS) comprising a driver monitoring camera 118 disposed at a back plate 120 (and viewing through an aperture of the back plate) behind the reflective element 114 (that is adhesively attached at the back plate 120 via tape or foam) and viewing through the reflective element toward a head region of the driver of the vehicle. The mirror assembly includes a printed circuit board (PCB) 122 having a control or control unit comprising electronic circuitry (disposed at the circuit board or substrate in the mirror casing), which includes driver circuitry for controlling dimming of the mirror reflective element. The mirror assembly also includes a DMS circuit board 123, which includes the processor that processes image data captured by the camera 118 for monitoring the driver and determining, for example, driver attentiveness and/or driver drowsiness.

Figure 16:
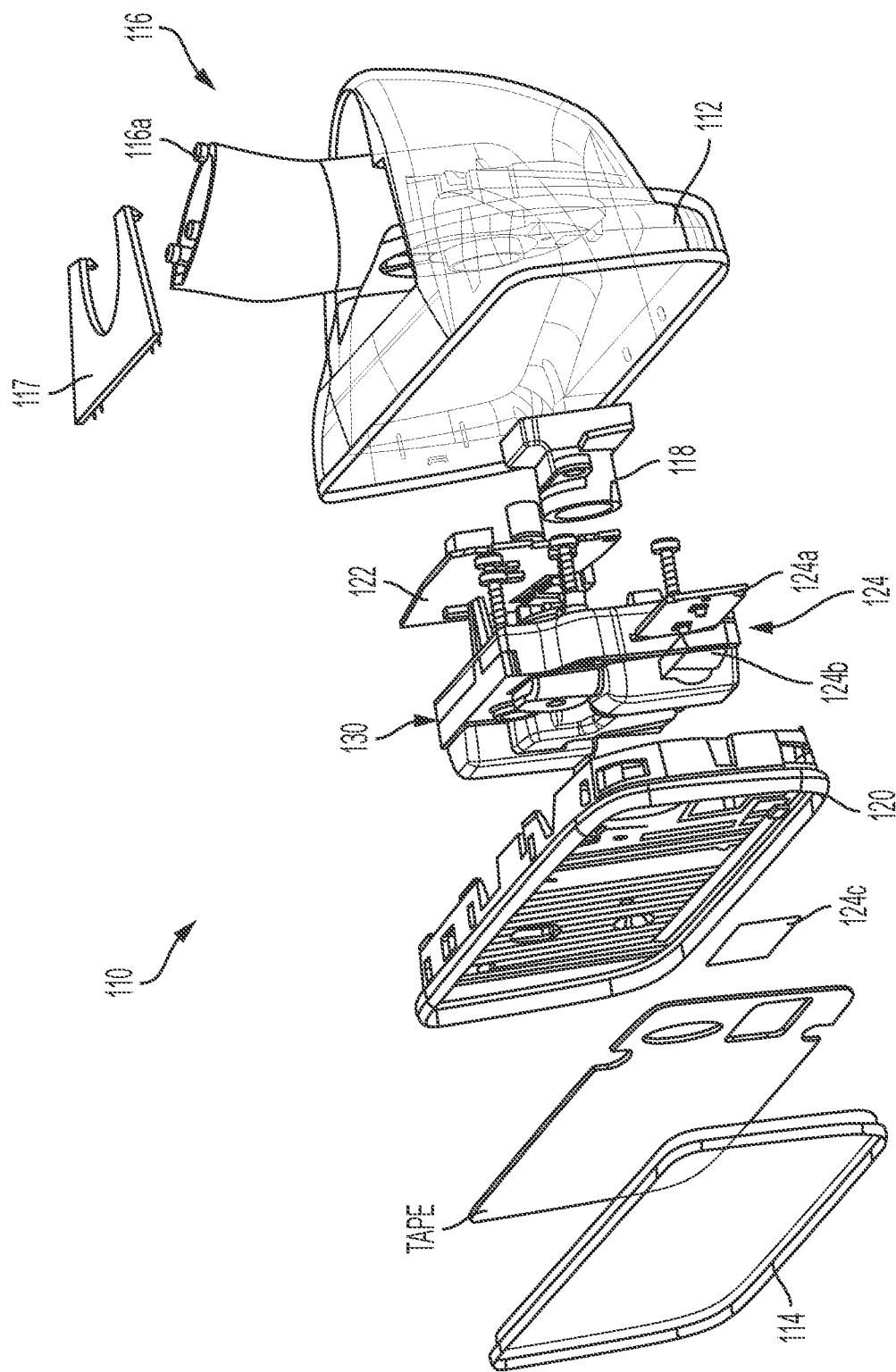
FIG. 16 is an exploded perspective view of the interior rearview mirror assembly.

The mirror assembly also include one or more infrared (IR) or near infrared light emitters 124 (such as IR or near-IR light emitting diodes (LEDs) or vertical-cavity surface-emitting lasers (VCSEL) or the like) disposed at the back plate 120 behind the reflective element 114 and emitting near infrared light through an aperture of the back plate and through the reflective element toward the head region of the driver of the vehicle. As shown in FIG. 16, the IR emitter or LED device 124 comprises an IR emitter or LED printed circuit board 124a, a lens array optic 124b and a longpass IR filter 124c (or IR bandpass filter). The PCB 122 includes circuitry for controlling the IR emitters.

The actuator 130 is attached at the rear of the back plate and is attached at the mounting assembly or structure 116, whereby operation of the actuator adjusts the back plate and mirror reflective element relative to the mounting structure. The mirror casing 112 may be attached at the back plate so as to move in tandem with the back plate and reflective element. An upper portion of the mirror casing has an opening to allow for movement of the mirror casing relative to the mounting structure. A cover element 117 may be attached at the mirror casing to close part of the aperture, which may be oversized to allow for assembly of the mirror by inserting part of the mounting structure through the opening through the upper portion of the mirror casing. With the cover element attached at the mirror casing, there is sufficient clearance between the mounting structure and the cover to allow for movement of the mirror head relative to the mounting structure via the actuator (or via manual adjustment that is allowed by the actuator via clutch mechanisms or the like at the actuator).

Known interior mirrors require physical interaction to adjust the driver's rearward field of view, and typically they are adjusted one time and left in that orientation unless a different driver drives the vehicle. The mirror assembly 110 provides automatic adjustment of the mirror head and mirror reflective element without the need for physical interaction and allows for multiple saved positions for multiple different drivers of the vehicle.

The mirror system uses image processing of image data captured by the DMS camera 118 in the mirror head to recognize signs of distraction and/or fatigue by determining the driver's head position and eye position (e.g., pitch, roll and/or yaw of the driver's head or eyes), and may determine presence of other objects, such as a cell phone or water bottle or coffee cup or food or the like in the driver's hand. The mirror system may also use image processing of the image data captured by the DMS camera 118 for driver identification, such as to identify the driver for associating that driver with respective memory features, such as exterior mirror memory settings and/or interior mirror memory settings. The inward facing DMS camera may locate the driver's head position and adjust the mirror head (and/or mirror reflective element) accordingly. The system may recognize the driver upon entry of the vehicle by the driver and may move the camera and mirror head to the previously recorded or stored position (which may be initially set by the driver when he or she first drivers the vehicle).

Figure 19:
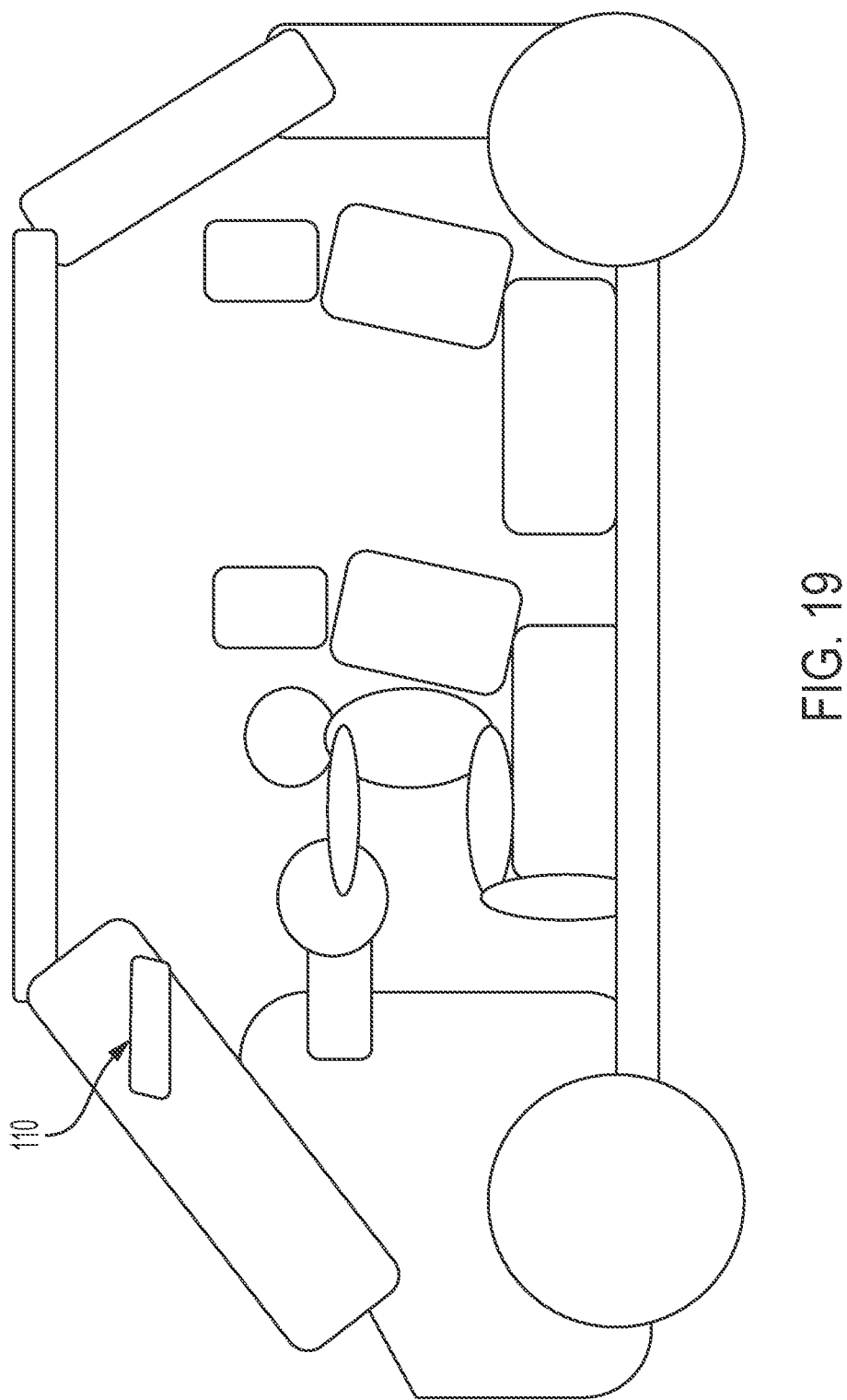
FIGS. 19-22 are side views of a vehicle showing adjustment of the mirror head responsive to different drivers driving the vehicle.
Figure 20:
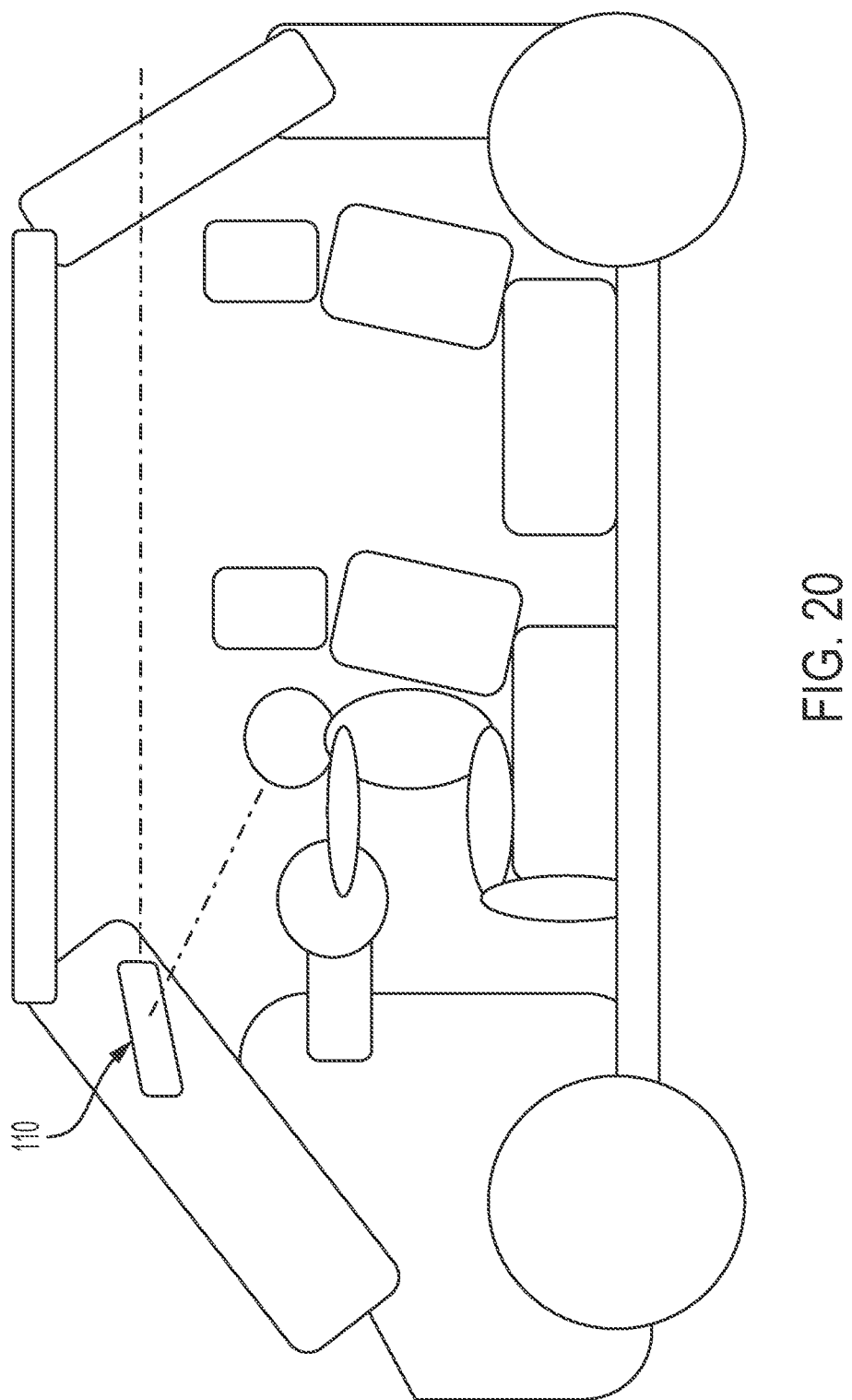
Figure 21:
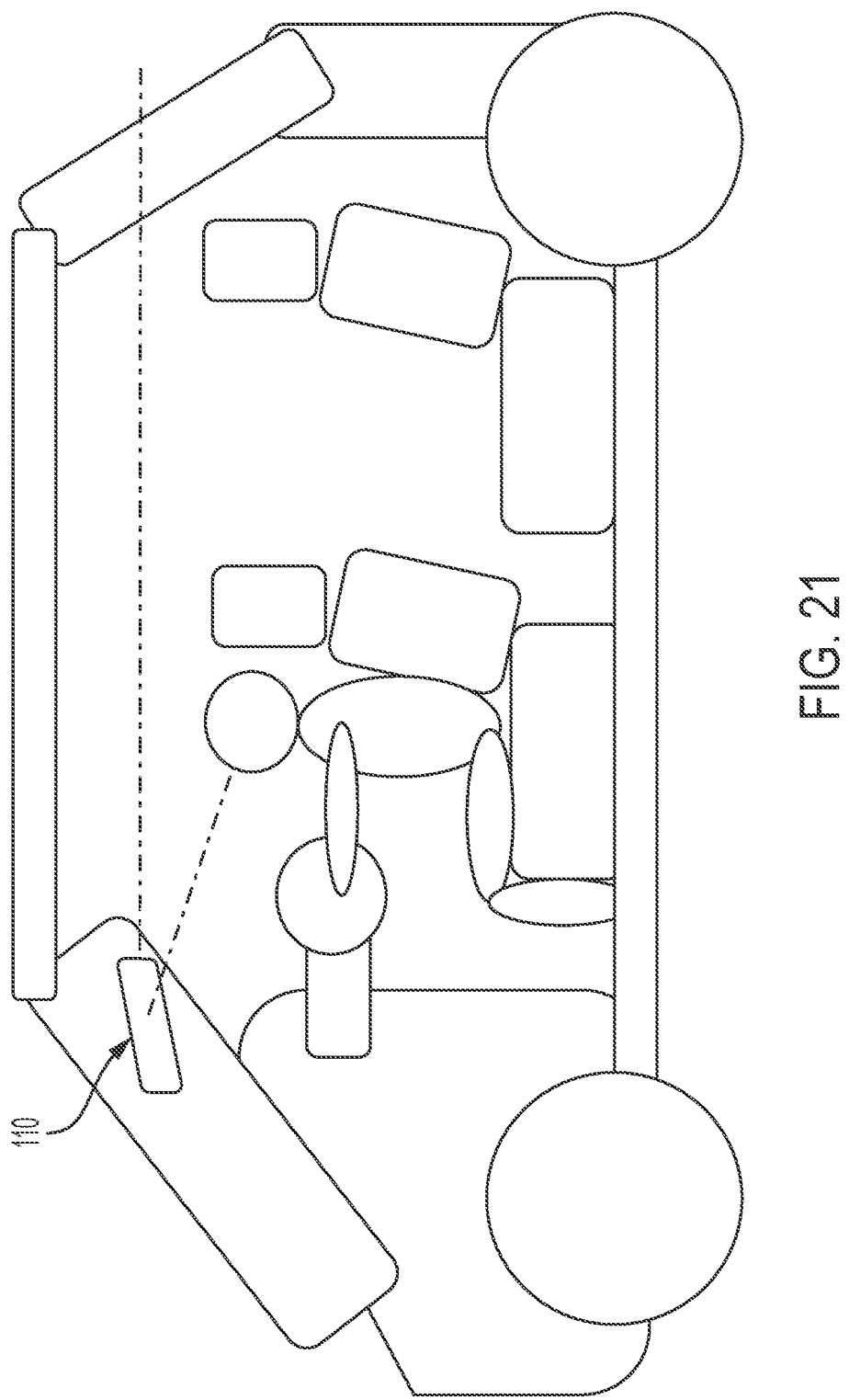
Figure 22:
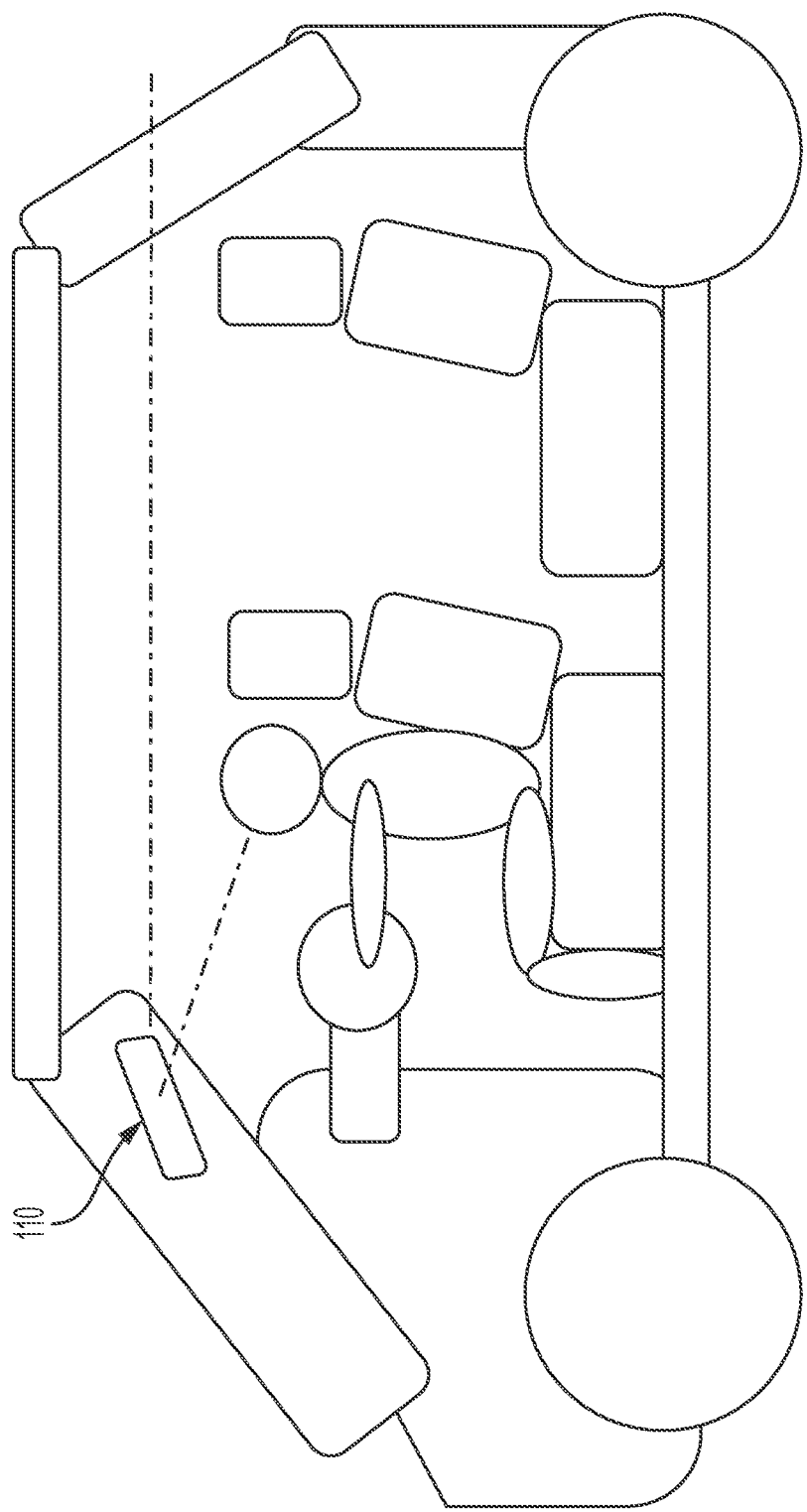

The camera can be used for the actuator memory (where the memory position that is stored is based on the camera's position and orientation in the vehicle) instead of a separate actuator memory, such as a potentiometer or the like. Thus, upon identification of a particular driver in the vehicle, the system may adjust the mirror head (via operation of the mirror actuator) to position the camera (and thus to adjust the mirror reflective element) so that the camera is viewing the saved features at the saved locations (e.g., until the camera views a particular feature at an angle and position in the camera's field of view that corresponds with the saved position). For example, the actuator may adjust the mirror head and camera until the rear window is at the appropriate or saved location in the field of view of the camera). Thus, and with reference to FIGS. 19-22, when a particular driver enters the vehicle, the system may adjust the mirror head from its initial position (FIG. 19) to an adjusted position (FIG. 20) for that driver based on previously stored parameters. When a different driver enters the vehicle, the system may adjust the mirror head from the previous position (FIG. 21) to an adjusted position (FIG. 22) for that driver based on previously stored parameters for that driver.

Figure 23:
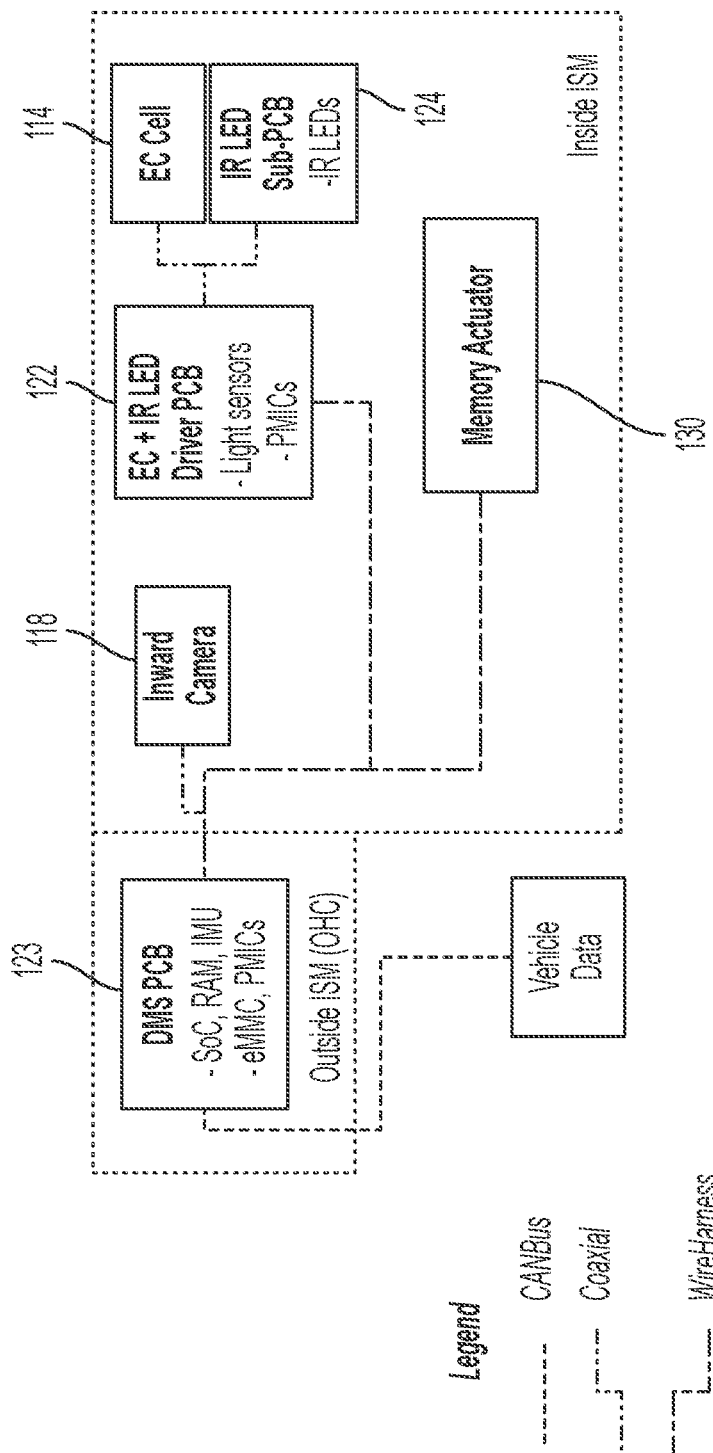
FIG. 23 is a block diagram of the interior rearview mirror assembly having a memory actuator.

The system may utilize any suitable face tracking software or algorithms. As shown in FIG. 23, the inside mirror head includes the inward camera, the memory actuator and a driver for the EC and infrared LED, which controls or drives the EC cell and the infrared LED. The DMS PCB may be disposed outside of the mirror head (such as at the vehicle console or the like) and includes the circuitry and associated software for processing the image data captured by the camera and controlling the memory actuator accordingly. The DMS PCB may also operate responsive at least in part to vehicle data provided via a CAN bus of the vehicle.

Thus, the system controls a mirror actuator responsive to processing of image data captured by the DMS camera in the mirror head to adjust the mirror to the optimal field of view for the driver upon startup of the vehicle by the driver. No initial physical interaction between the driver and the mirror is necessary. The system and mirror actuator may only operate at startup and will not continue to be adjusted as the driver may move his or her head while operating the vehicle. This allows the driver to move his or her head to obtain a different perspective or view rearward for different situations.

The mirror assembly and/or mirror actuator may utilize aspects of the mirror systems described in U.S. Pat. Nos. 9,616,815; 7,722,199 and/or 6,698,905, which are hereby incorporated herein by reference in their entireties. The mirror assembly (such as the mounting base) may be mounted at the in-cabin side of the vehicle windshield or the mirror assembly may be located or attached elsewhere at the vehicle, such as at an overhead console or headliner of the vehicle or the like. Also, although shown and described as an actuator system for adjusting the driver's rearward view at an interior rearview mirror assembly, aspects of the actuator system may be suitable for use with exterior rearview mirror assemblies of vehicles.

Figure 24:
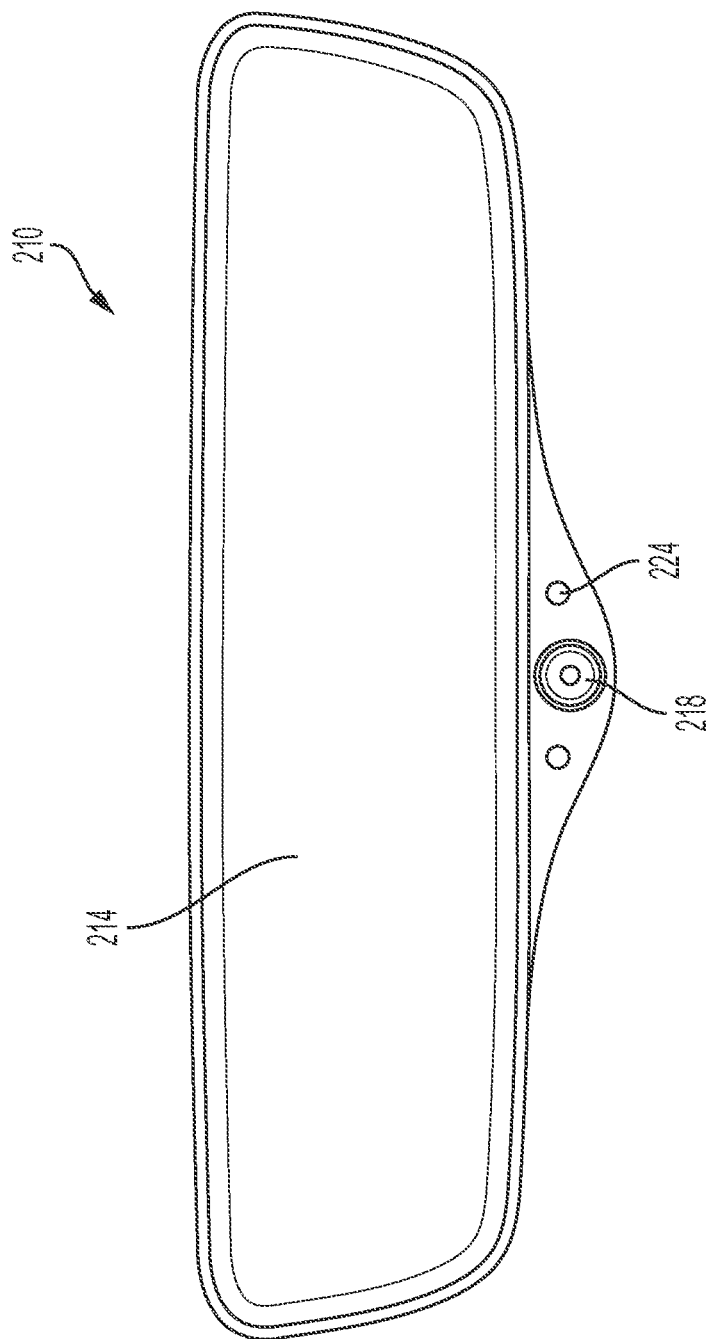
FIG. 24 is a view of another interior rearview mirror assembly, with the driver monitoring camera disposed at a lower region of the mirror head of the interior rearview mirror assembly.

Optionally, and such as shown in FIG. 24, an interior rearview mirror assembly 210 has the driver monitoring camera 218 and the IR emitter(s) 224 (such as IR or near-IR light emitting diodes (LEDs) or vertical-cavity surface-emitting lasers (VCSEL) or the like) disposed at a lower part of the mirror head (at the "chin" region of the mirror). In such an embodiment, the camera 218 does not view through the mirror reflective element 214 and the IR light emitters do not emit IR light through the mirror reflective element, but instead are located below the mirror reflective element. The function and components of the mirror assembly 210 may otherwise be similar to the mirror assemblies 10, 110, such that a detailed description of the mirror assemblies need not be repeated herein.

Optionally, the interior mirror assembly comprises a dual-mode interior rearview video mirror that can switch from a traditional reflection mode to a live-video display mode, such as is by utilizing aspects of the mirror assemblies and systems described in U.S. Pat. Nos. 10,442,360; 10,421,404; 10,166,924 and/or 10,046,706, and/or U.S. Publication Nos. US-2020-0377022; US-2019-0258131; US-2019-0146297; US-2019-0118717 and/or US-2017-0355312, and/or U.S. patent application Ser. No. 16/949,976, filed Nov. 23, 2020, and/or U.S. patent application Ser. No. 17/247,127, filed Dec. 1, 2020, which are all hereby incorporated herein by reference in their entireties. The electrically operated actuator may provide the memory setting function and may also operate to adjust the mirror head between the reflection mode and video display mode, such as responsive to a user actuatable input in the vehicle or at the mirror assembly (e.g., a toggle or switch or button at the mirror head).

Figure 25:
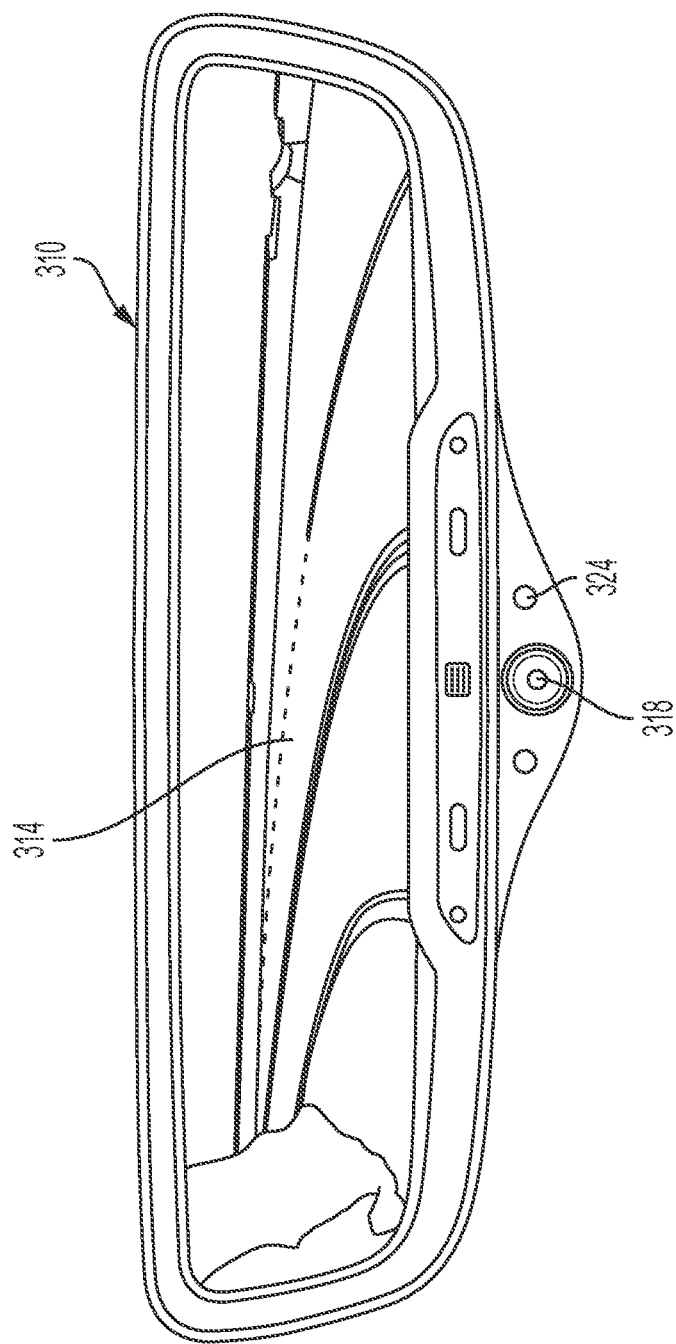
FIG. 25 is a view of another interior rearview mirror assembly, with the driver monitoring camera disposed at the mounting structure of the interior rearview mirror assembly, and with the mirror assembly comprising a full mirror display.
Figure 26:
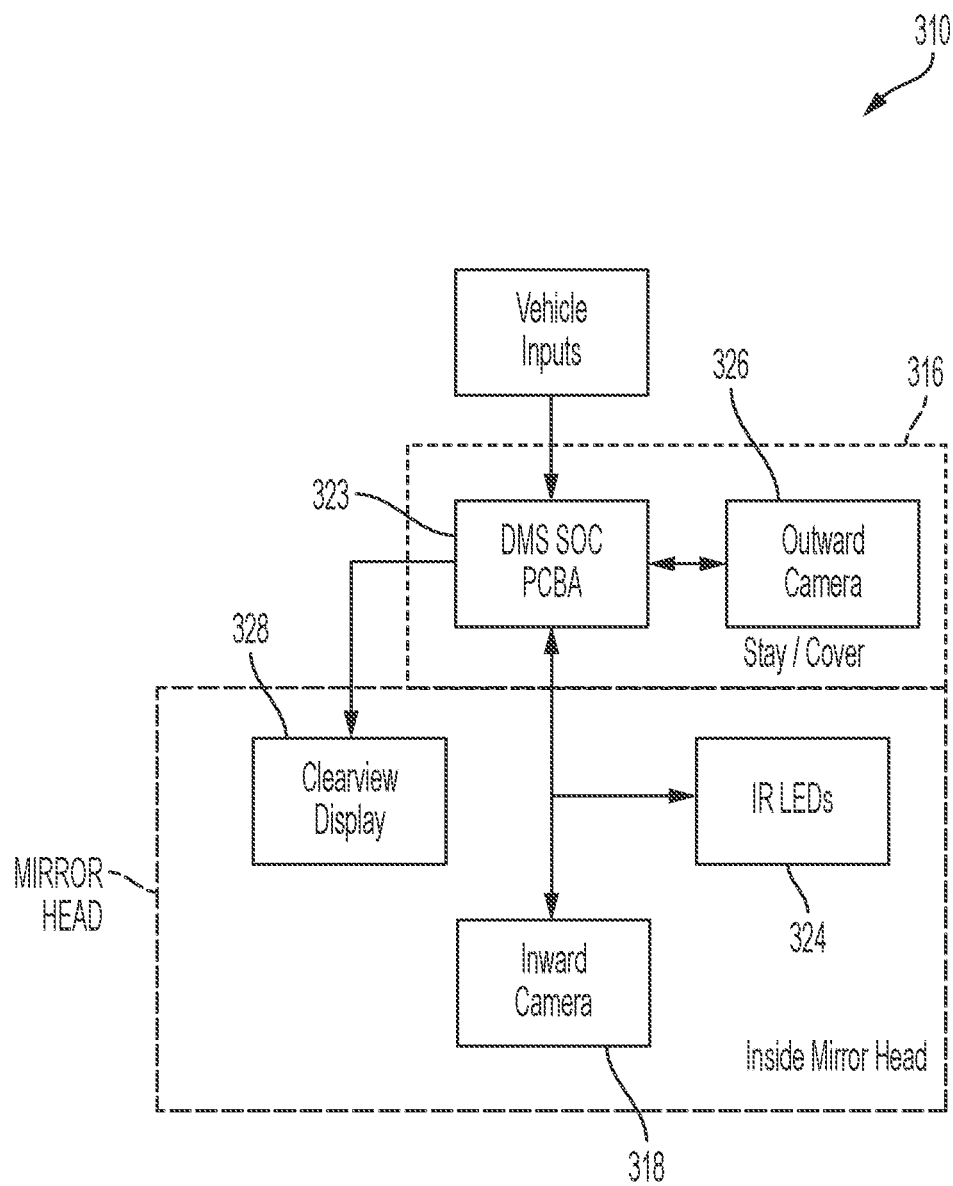
FIG. 26 is a block diagram of the driver monitoring system for the interior rearview mirror assembly of FIG. 25.

For example, and such as shown in FIGS. 25 and 26, an interior rearview mirror assembly 310 may comprise a full mirror display that provides a video display screen 328 over substantially entirely the active reflective region of the mirror reflective element. Thus, and similar to mirror assembly 110, discussed above, the mirror assembly 310 has the camera 318 and IR emitters 324 (such as IR or near-IR light emitting diodes (LEDs) or vertical-cavity surface-emitting lasers (VCSEL) or the like) disposed at the chin region of the mirror head. In such an embodiment, the DMS PCB 323 is disposed at the mirror mount 316 so that it does not interfere with the display screen disposed at and behind the rear of the mirror reflective element.

Optionally, the driver monitoring camera and the IR emitter(s) may be disposed at a lower part of the mirror mount. Thus, both components are not coupled with the mirror head and thus the camera perspective is not subject to change from driver to driver as the mirror head is adjusted to set the desired rearward view for the current driver. The forward or outward viewing camera is also fixed within the mirror mount and the cover, and thus the camera's view is not subject to change based on adjustment by the driver. The processor is disposed within or accommodated by the mirror head and receives inputs from the cameras (such as via wires passing through the mounting arm and pivot joint) and processes the received camera inputs to detect and inform the driver of distractions or other valuable information. Optionally, the driver monitoring camera and/or IR emitters and/or processor may be disposed at the overhead console of the vehicle.

Figure 27:
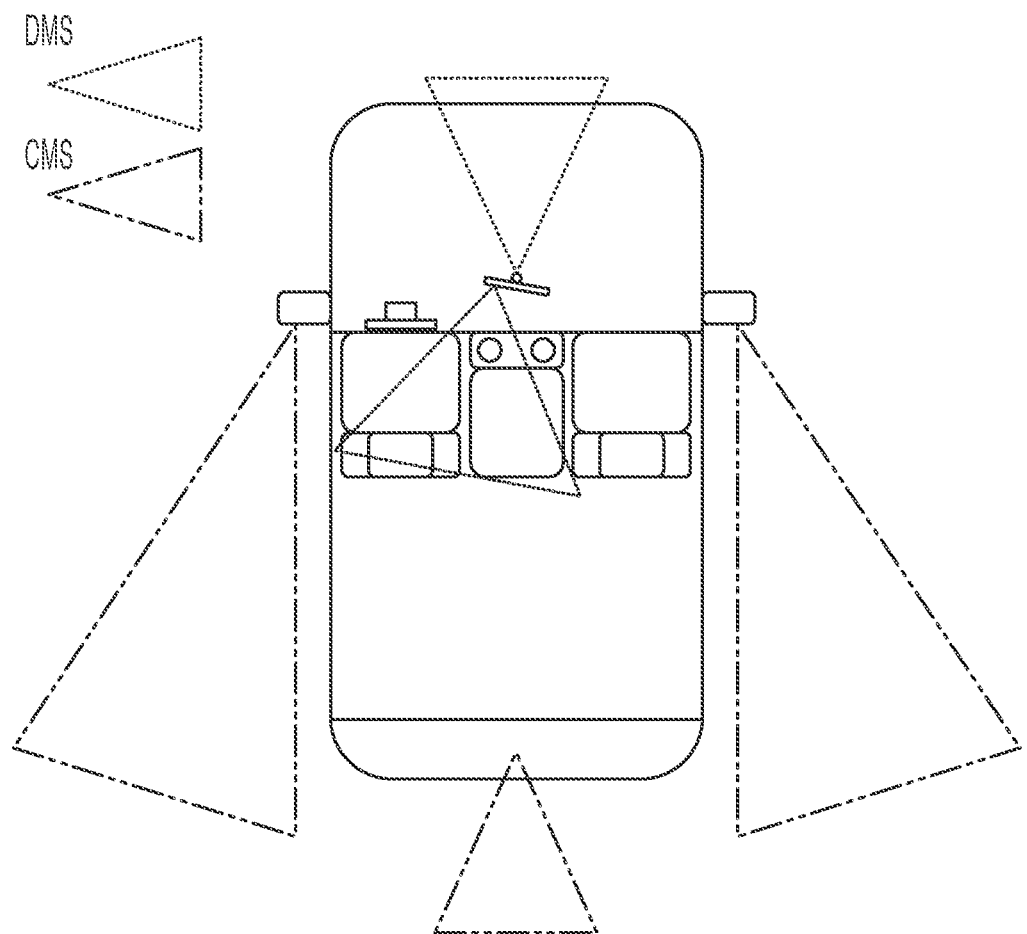
FIG. 27 is a plan view of a vehicle having the driver monitoring system and a camera monitoring system.

Optionally, and such as shown in FIG. 27, the driver monitoring system may be integrated with a camera monitoring system (CMS) of the vehicle. The integrated vehicle system incorporates multiple inputs, such as from the inward viewing or driver monitoring camera and from the forward or outward viewing camera, as well as from a rearward viewing camera and sideward viewing cameras of the CMS, to provide the driver with unique collision mitigation capabilities based on full vehicle environment and driver awareness state. The image processing and detections and determinations are performed locally within the interior rearview mirror assembly and/or the overhead console region, depending on available space and electrical connections for the particular vehicle application.

The CMS cameras and system may utilize aspects of the systems described in U.S. Publication Nos. US-2018-0134217 and/or US-2014-0285666, and/or U.S. patent application Ser. No. 17/248,736, filed Feb. 5, 2021, U.S. patent application Ser. No. 17/247,127, filed Dec. 1, 2020, and/or U.S. patent application Ser. No. 16/949,976, filed Nov. 23, 2020, and/or U.S. provisional application Ser. No. 63/199,858, filed Jan. 29, 2021, and/or U.S. provisional application Ser. No. 63/199,526, filed Jan. 6, 2021, which are hereby incorporated herein by reference in their entireties. The connections between the cameras and the controller or PCB(s) and/or between the displays and the controllers or PCBs may be made via respective coaxial cables, which may provide power and control of the cameras (by the controller) and which may provide image data from the cameras to the controller, and which may provide video images from the controller to the display devices. The connections and communications may utilize aspects of the systems described in U.S. Pat. Nos. 10,264,219; 9,900,490 and/or 9,609,757, which are hereby incorporated herein by reference in their entireties.

The mirror reflective element comprises a variable reflectance electro-optic mirror reflective element, such as an electrochromic mirror reflective element or a liquid crystal mirror reflective element. For example, the mirror reflective element may comprise a laminate construction variable reflectance electro-optic (such as electrochromic) reflective element assembly having a front glass substrate and a rear glass substrate with an electro-optic medium (such as electrochromic medium) sandwiched therebetween and bounded by a perimeter seal. The front substrate has a front or first surface (the surface that generally faces the driver of a vehicle when the mirror assembly is normally mounted at the vehicle) and a rear or second surface opposite the front surface, and the rear substrate has a front or third surface and a rear or fourth surface opposite the front surface, with the electro-optic medium disposed between the second surface and the third surface and bounded by the perimeter seal of the reflective element (such as is known in the electrochromic mirror art). The second surface has a transparent conductive coating established thereat (such as an indium tin oxide (ITO) layer, or a doped tin oxide layer or any other transparent electrically semi-conductive layer or coating or the like (such as indium cerium oxide (ICO), indium tungsten oxide (IWO), or indium oxide (IO) layers or the like or a zinc oxide layer or coating, or a zinc oxide coating or the like doped with aluminum or other metallic materials, such as silver or gold or the like, or other oxides doped with a suitable metallic material or the like, or such as disclosed in U.S. Pat. No. 7,274,501, which is hereby incorporated herein by reference in its entirety), while the third surface has a metallic reflector coating (or multiple layers or coatings) established thereat. The front or third surface of the rear substrate may include one or more transparent semi-conductive layers (such as an ITO layer or the like), and one or more metallic electrically conductive layers (such as a layer of silver, aluminum, chromium or the like or an alloy thereof), and may include multiple layers such as disclosed in U.S. Pat. Nos. 7,274,501; 7,184,190 and/or 7,255,451, which are hereby incorporated herein by reference in their entireties.

The mirror reflector may comprise any suitable coatings or layers, such as a transflective coating or layer (that is partially transmissive of visible light and/or near infrared light and that is partially reflective of visible light), such as described in U.S. Pat. Nos. 7,626,749; 7,274,501; 7,255, 451; 7,195,381; 7,184,190; 6,690,268; 5,140,455; 5,151, 816; 6,178,034; 6,154,306; 6,002,511; 5,567,360; 5,525, 264; 5,610,756; 5,406,414; 5,253,109; 5,076,673; 5,073, 012; 5,115,346; 5,724,187; 5,668,663; 5,910,854; 5,142,407 and/or 4,712,879, which are hereby incorporated herein by reference in their entireties, disposed at the front surface of the rear substrate (commonly referred to as the third surface of the reflective element) and opposing the electro-optic medium, such as an electrochromic medium disposed between the front and rear substrates and bounded by the perimeter seal (but optionally, the mirror reflector could be disposed at the rear surface of the rear substrate (commonly referred to as the fourth surface of the reflective element), while remaining within the spirit and scope of the present invention). The driver monitoring camera may be accommodated in the mirror head and view through the transflective mirror reflector toward the driver's head region and/or the near IR light emitter may be accommodated in the mirror head and emit light that passes through the transflective mirror reflector to illuminate the driver's head region. The transflective mirror reflector may be spectrally tuned so as to transmit or pass a particular spectral band of light (e.g., near infrared light) while reflecting other spectral bands of light (e.g., visible light). The camera may be sensitive to near infrared light, such that the near IR light emitter can emit near IR light that passes through the transflective mirror reflector and the camera may be sensitive to the near IR light that reflects off of the driver's head and passes back through the transflective mirror reflector.

The third surface defines the active EC area or surface of the rear substrate within the perimeter seal. The coated third surface may also be coated to define a tab-out region (such as by utilizing aspects of the mirror assemblies described in U.S. Pat. Nos. 7,274,501; 7,184,190 and/or 7,255,451, which are hereby incorporated herein by reference in their entireties) for providing electrical connection of the conductive layers to an electrical clip of connector or bus-bar, such as the types described in U.S. Pat. Nos. 5,066,112 and 6,449,082, which are hereby incorporated herein by reference in their entireties.

The reflective element and mirror casing are adjustable relative to a base portion or mounting assembly to adjust the driver's rearward 'view when the mirror assembly is normally mounted at or in the vehicle. The mounting assembly may comprise a single-ball or single-pivot mounting assembly, whereby the reflective element and casing are adjustable relative to the vehicle windshield (or other interior portion of the vehicle) about a single pivot joint, or the mounting assembly may comprise other types of mounting configurations, such as a double-ball or double-pivot mounting configuration or the like, while remaining within the spirit and scope of the present invention. The socket or pivot element is configured to receive a ball member of the base portion, such as for a single pivot or single ball mounting structure or a double pivot or double ball mounting structure or the like (such as a pivot mounting assembly of the types described in U.S. Pat. Nos. 6,318,870; 6,593,565; 6,690,268; 6,540,193; 4,936,533; 5,820,097; 5,100,095; 7,249,860; 6,877,709; 6,329,925; 7,289,037; 7,249,860 and/or 6,483,438, which are hereby incorporated herein by reference in their entireties).

The mirror assembly may comprise any suitable construction, such as, for example, a mirror assembly with the reflective element being nested in the mirror casing and with a bezel portion that circumscribes a perimeter region of the front surface of the reflective element, or with the mirror casing having a curved or beveled perimeter edge around the reflective element and with no overlap onto the front surface of the reflective element (such as by utilizing aspects of the mirror assemblies described in U.S. Pat. Nos. 7,184,190; 7,274,501; 7,255,451; 7,289,037; 7,360,932; 7,626,749; 8,049,640; 8,277,059 and/or 8,529,108, which are hereby incorporated herein by reference in their entireties) or such as a mirror assembly having a rear substrate of an electro-optic or electrochromic reflective element nested in the mirror casing, and with the front substrate having curved or beveled perimeter edges, or such as a mirror assembly having a prismatic reflective element that is disposed at an outer perimeter edge of the mirror casing and with the prismatic substrate having curved or beveled perimeter edges, such as described in U.S. Pat. Nos. 8,508,831; 8,730,553; 9,598,016 and/or 9,346,403, and/or U.S. Publication Nos. US-2014-0313563 and/or US-2015-0097955, which are hereby incorporated herein by reference in their entireties (and with electrochromic and prismatic mirrors of such construction are commercially available from the assignee of this application under the trade name INFINITY™ mirror).

Optionally, the mirror casing may include a bezel portion that circumscribes a perimeter region of the front surface of the reflective element, or the perimeter region of the front surface of the reflective element may be exposed (such as by utilizing aspects of the mirror reflective elements described in U.S. Pat. No. 8,508,831 and/or 8,730,553, and/or U.S. Publication Nos. US-2014-0022390; US-2014-0293169 and/or US-2015-0097955, which are hereby incorporated herein by reference in their entireties).

Although shown as an electro-optic mirror application, it is envisioned that the mirror assembly may comprise a prismatic reflective element, while remaining within the spirit and scope of the present invention. The prismatic mirror assembly may be mounted or attached at an interior portion of a vehicle (such as at an interior surface of a vehicle windshield) via the mounting means described above, and the reflective element may be toggled or flipped or adjusted between its daytime reflectivity position and its nighttime reflectivity position via any suitable toggle means, such as by utilizing aspects of the mirror assemblies described in U.S. Pat. Nos. 7,420,756; 7,338,177; 7,289,037; 7,274,501; 7,255,451; 7,249,860; 6,318,870; 6,598,980; 5,327,288; 4,948,242; 4,826,289; 4,436,371 and/or 4,435,042, and/or U.S. Publication No. US-2010-0085653, which are hereby incorporated herein by reference in their entireties.

Optionally, the mirror assembly may include one or more other displays, such as the types disclosed in U.S. Pat. No. 5,530,240 and/or 6,329,925, which are hereby incorporated herein by reference in their entireties, and/or display-on-demand transflective type displays, and/or video displays or display screens, such as the types disclosed in U.S. Pat. Nos. 8,890,955; 7,855,755; 7,338,177; 7,274,501; 7,255,451; 7,195,381; 7,184,190; 7,046,448; 5,668,663; 5,724,187; 5,530,240; 6,329,925; 6,690,268; 7,734,392; 7,370,983; 6,902,284; 6,428,172; 6,420,975; 5,416,313; 5,285,060; 5,193,029 and/or 4,793,690, and/or in U.S. Pat. Pub. Nos. US-2006-0050018; US-2009-0015736; US-2009-0015736 and/or US-2010-0097469, which are all hereby incorporated herein by reference in their entireties.

The video display screen may be controlled or operable in response to an input or signal, such as a signal received from one or more cameras or image sensors of the vehicle, such as a video camera or sensor, such as a CMOS imaging array sensor, a CCD sensor or the like, and image processors or image processing techniques, such as utilizing aspects of the cameras and image processors described U.S. Pat. Nos. 5,550,677; 5,670,935; 5,760,962; 6,690,268; 6,498,620; 6,396,397; 6,222,447; 6,201,642; 6,097,023; 5,877,897; 5,796,094; 5,715,093; 6,922,292; 6,757,109; 6,717,610; 6,590,719; 6,320,176; 6,559,435; 6,831,261; 6,806,452; 6,822,563; 6,946,978; 7,038,577; 7,004,606; 7,720,580; 8,446,470; 8,451,107 and/or 9,126,525, and/or U.S. Pat. Pub. Nos. US-2006-0171704; US-2009-0244361 and/or US-2010-0214791, which are all hereby incorporated herein by reference in their entireties. The imaging sensor or camera may be activated and the display screen may be activated in response to the vehicle shifting into reverse, such that the display screen is viewable by the driver and is displaying an image of the rearward scene while the driver is reversing the vehicle. It is envisioned that the image processor or controller comprises the likes of an EYEQ™ image processing chip available from Mobileye Vision Technologies Ltd. of Jerusalem, Israel, and processes image data captured by the forward viewing camera and the driver monitoring camera (and optionally surround view cameras and/or CMS cameras of the vehicle).

Changes and modifications in the specifically described embodiments may be carried out without departing from the principles of the present invention, which is intended to be limited only by the scope of the appended claims as interpreted according to the principles of patent law.

The invention claimed is:

1. A vehicular driver monitoring system, the vehicular driver monitoring system comprising:
a vehicular interior rearview mirror assembly comprising a mirror head adjustable about a mounting base, the mounting base configured to attach at an interior portion of a vehicle equipped with the vehicular driver monitoring system;
wherein the mirror head comprises a mirror casing and a mirror reflective element;
a driver monitoring camera accommodated by the mirror head, wherein the driver monitoring camera moves in tandem with the mirror head when, with the mounting base attached at the interior portion of the vehicle, the mirror head is adjusted relative to the mounting base to adjust a rearward view for a driver of the vehicle;
at least one near infrared light emitter accommodated by the mirror head, wherein, with the mounting base attached at the interior portion of the vehicle, the at least one near infrared light emitter is operable to emit near infrared light toward a head region of the driver of the vehicle;
an electronic control unit (ECU) comprising a processor operable to process image data captured by the driver monitoring camera;
wherein, with the mounting base attached at the interior portion of the vehicle, image data captured by the driver monitoring camera is processed at the ECU to determine at least one selected from the group consisting of (i) driver attentiveness and (ii) driver drowsiness; and
wherein, with the mounting base attached at the interior portion of the vehicle, and responsive to processing at the ECU of image data captured by the driver monitoring camera, the vehicular driver monitoring system adjusts processing of image data captured by the driver monitoring camera to accommodate adjustment of the mirror head when the driver adjusts the mirror head to adjust his or her rearward view.

2. The vehicular driver monitoring system of claim 1, wherein, with the mounting base attached at the interior portion of the vehicle, image data captured by the driver monitoring camera is processed at the ECU to determine at least one feature of the head of the driver selected from the group consisting of (i) the driver speaking, (ii) the driver's head nodding, (iii) the driver laughing, (iv) the driver coughing, (v) the driver sneezing and (vi) the driver yawning.

3. The vehicular driver monitoring system of claim 1, wherein, with the mounting base attached at the interior portion of the vehicle, image data captured by the driver monitoring camera is processed at the ECU to identify the driver of the vehicle.

4. The vehicular driver monitoring system of claim 1, wherein, with the mounting base attached at the interior portion of the vehicle, image data captured by the driver monitoring camera is processed at the ECU to determine the driver's head posture.

5. The vehicular driver monitoring system of claim 1, wherein, with the mounting base attached at the interior portion of the vehicle, image data captured by the driver monitoring camera is processed at the ECU to determine at least one feature of a position of the driver selected from the group consisting of (i) the driver's position in a driver's seat and (ii) the driver's hand position.

6. The vehicular driver monitoring system of claim 1, wherein, with the mounting base attached at the interior portion of the vehicle, image data captured by the driver monitoring camera is processed at the ECU to determine that the eyes of the driver are closed.

7. The vehicular driver monitoring system of claim 1, wherein, with the mounting base attached at the interior portion of the vehicle, image data captured by the driver monitoring camera is processed at the ECU to determine a gaze direction of the driver.

8. The vehicular driver monitoring system of claim 7, wherein, responsive to determination of a hazard ahead of the vehicle at a region not being viewed by the driver, an alert is generated.

9. The vehicular driver monitoring system of claim 1, wherein the driver monitoring camera and the at least one near infrared light emitter are accommodated within the mirror head behind the mirror reflective element, and wherein the driver monitoring camera views through the mirror reflective element and the at least one near infrared light emitter emits near infrared light through the mirror reflective element.

10. The vehicular driver monitoring system of claim 9, wherein the driver monitoring camera views through a transflective mirror reflector of the mirror reflective element, and wherein the at least one near infrared light emitter emits near infrared light that passes through the transflective mirror reflector of the mirror reflective element.

11. The vehicular driver monitoring system of claim 1, wherein the at least one near infrared light emitter comprises a plurality of near infrared light emitters, and wherein, with the mounting base attached at the interior portion of the vehicle, the driver monitoring camera and the plurality of near infrared light emitters are disposed at a lower region of the mirror head.

12. The vehicular driver monitoring system of claim 1, wherein, with the mounting base attached at the interior portion of the vehicle, the driver monitoring camera and the at least one near infrared light emitter are disposed at a lower region of the mirror head and below the mirror reflective element.

13. The vehicular driver monitoring system of claim 1, wherein the at least one near infrared light emitter is accommodated by the mounting base.

14. The vehicular driver monitoring system of claim 1, wherein the driver monitoring camera is accommodated by the mirror head behind the mirror reflective element, and wherein the driver monitoring camera views through the mirror reflective element.

15. The vehicular driver monitoring system of claim 14, wherein the driver monitoring camera views through a transflective mirror reflector of the mirror reflective element.

16. The vehicular driver monitoring system of claim 1, wherein the at least one near infrared light emitter comprises a plurality of near infrared light emitters, and wherein, with the mounting base attached at the interior portion of the vehicle, the driver monitoring camera is disposed at a lower region of the mirror head.

17. The vehicular driver monitoring system of claim 1, wherein, with the mounting base attached at the interior portion of the vehicle, the driver monitoring camera is disposed at a lower region of the mirror head and below the mirror reflective element.

18. The vehicular driver monitoring system of claim 1, wherein the ECU is accommodated within the mirror head.

19. The vehicular driver monitoring system of claim 1, wherein the ECU is accommodated by the mounting base.

20. The vehicular driver monitoring system of claim 1, comprising a video display screen accommodated by the mirror head and behind the mirror reflective element, wherein video images displayed by the video display screen are viewable through a transflective mirror reflector of the mirror reflective element.

21. The vehicular driver monitoring system of claim 1, further comprising an electrically operated actuator that, when electrically powered, adjusts the mirror reflective element relative to the mounting base.

22. The vehicular driver monitoring system of claim 21, wherein, with the mounting base attached at the interior portion of the vehicle, the actuator adjusts the mirror reflective element relative to the mounting base responsive to processing at the ECU of image data captured by the driver monitoring camera.

23. The vehicular driver monitoring system of claim 22, wherein, with the mounting base attached at the interior portion of the vehicle, the actuator adjusts the mirror reflective element relative to the mounting base to position the mirror reflective element at a memory position associated with the particular driver of the vehicle.

24. The vehicular driver monitoring system of claim 23, wherein, with the mounting base attached at the interior portion of the vehicle, the actuator adjusts the mirror reflective element relative to the mounting base to position the mirror reflective element at the memory position associated with the particular driver of the vehicle responsive to identification, via processing at the ECU of image data captured by the driver monitoring camera, of the driver of the vehicle.

25. The vehicular driver monitoring system of claim 24, wherein, with the mounting base attached at the interior portion of the vehicle, the actuator adjusts the mirror reflective element relative to the mounting base to position the mirror reflective element at the memory position associated with the particular driver of the vehicle by adjusting the mirror head and driver monitoring camera until at least one feature viewed by the driver monitoring camera corresponds to a stored position of that at least one feature.

26. The vehicular driver monitoring system of claim 1, wherein the interior portion of the vehicle comprises a portion of a windshield of the vehicle at an in-cabin side of the windshield.

27. The vehicular driver monitoring system of claim 1, wherein the at least one near infrared light emitter comprises a plurality of light emitting diodes.

28. A vehicular driver monitoring system, the vehicular driver monitoring system comprising:
a vehicular interior rearview mirror assembly comprising
a mirror head adjustable about a mounting base, the mounting base configured to attach at an interior portion of a vehicle equipped with the vehicular driver monitoring system;
wherein the mirror head comprises a mirror casing and a mirror reflective element;
a driver monitoring camera accommodated by the mirror head, wherein the driver monitoring camera moves in tandem with the mirror head when, with the mounting base attached at the interior portion of the vehicle, the mirror head is adjusted relative to the mounting base to adjust a rearward view for a driver of the vehicle;
a plurality of near infrared light emitting diodes accommodated by the mirror head, wherein, with the mounting base attached at the interior portion of the vehicle, the plurality of near infrared light emitting diodes is operable to emit near infrared light toward a head region of the driver of the vehicle;
wherein the driver monitoring camera and the plurality of near infrared light emitting diodes are accommodated within the mirror head behind the mirror reflective element, and wherein the driver monitoring camera views through the mirror reflective element and the plurality of near infrared light emitting diodes emits near infrared light through the mirror reflective element;
an electronic control unit (ECU) comprising a processor operable to process image data captured by the driver monitoring camera;
wherein, with the mounting base attached at the interior portion of the vehicle, image data captured by the driver monitoring camera is processed at the ECU to determine at least one selected from the group consisting of (i) driver attentiveness and (ii) driver drowsiness; and
wherein, with the mounting base attached at the interior portion of the vehicle, and responsive to processing at the ECU of image data captured by the driver monitoring camera, the vehicular driver monitoring system adjusts processing of image data captured by the driver monitoring camera to accommodate adjustment of the mirror head when the driver adjusts the mirror head to adjust his or her rearward view.

29. The vehicular driver monitoring system of claim 28, wherein, with the mounting base attached at the interior portion of the vehicle, image data captured by the driver monitoring camera is processed at the ECU to determine a gaze direction of the driver.

30. The vehicular driver monitoring system of claim 29, wherein, responsive to determination of a hazard ahead of the vehicle at a region not being viewed by the driver, an alert is generated.

31. The vehicular driver monitoring system of claim 28, wherein the driver monitoring camera views through a transflective mirror reflector of the mirror reflective element, and wherein the plurality of near infrared light emitting diodes emits near infrared light that passes through the transflective mirror reflector of the mirror reflective element.

32. The vehicular driver monitoring system of claim 28, wherein the ECU is accommodated within the mirror head.

33. The vehicular driver monitoring system of claim 28, wherein the ECU is accommodated by the mounting base.

34. The vehicular driver monitoring system of claim 28, wherein the interior portion of the vehicle comprises a portion of a windshield of the vehicle at an in-cabin side of the windshield.

35. A vehicular driver monitoring system, the vehicular driver monitoring system comprising:

a vehicular interior rearview mirror assembly comprising a mirror head adjustable about a mounting base, the mounting base configured to attach at an interior portion of a vehicle equipped with the vehicular driver monitoring system;

wherein the interior portion of the vehicle comprises a portion of a windshield of the vehicle at an in-cabin side of the windshield;

wherein the mirror head comprises a mirror casing and a mirror reflective element;

a driver monitoring camera accommodated by the mirror head, wherein the driver monitoring camera moves in tandem with the mirror head when, with the mounting base attached at the interior portion of the vehicle, the mirror head is adjusted relative to the mounting base to adjust a rearward view for a driver of the vehicle;

a plurality of near infrared light emitting diodes accommodated by the mirror head, wherein, with the mounting base attached at the interior portion of the vehicle, the plurality of near infrared light emitting diodes is operable to emit near infrared light toward a head region of the driver of the vehicle;

wherein, with the mounting base attached at the interior portion of the vehicle, the driver monitoring camera and the plurality of near infrared light emitting diodes are disposed at a lower region of the mirror head;

an electronic control unit (ECU) comprising a processor operable to process image data captured by the driver monitoring camera;

wherein, with the mounting base attached at the interior portion of the vehicle, image data captured by the driver monitoring camera is processed at the ECU to determine at least one selected from the group consisting of (i) driver attentiveness and (ii) driver drowsiness; and wherein, with the mounting base attached at the interior portion of the vehicle, and responsive to processing at the ECU of image data captured by the driver monitoring camera, the vehicular driver monitoring system adjusts processing of image data captured by the driver monitoring camera to accommodate adjustment of the mirror head when the driver adjusts the mirror head to adjust his or her rearward view.

36. The vehicular driver monitoring system of claim 35, wherein, with the mounting base attached at the interior portion of the vehicle, image data captured by the driver monitoring camera is processed at the ECU to determine a gaze direction of the driver.

37. The vehicular driver monitoring system of claim 36, wherein, responsive to determination of a hazard ahead of the vehicle at a region not being viewed by the driver, an alert is generated.

38. The vehicular driver monitoring system of claim 35, wherein the ECU is accommodated within the mirror head.

39. The vehicular driver monitoring system of claim 35, wherein the ECU is accommodated by the mounting base.

40. The vehicular driver monitoring system of claim 35, comprising a video display screen accommodated by the mirror head and behind the mirror reflective element, wherein video images displayed by the video display screen are viewable through a transflective mirror reflector of the mirror reflective element.

41. The vehicular driver monitoring system of claim 35, wherein, with the mounting base attached at the interior portion of the vehicle, the driver monitoring camera and the plurality of near infrared light emitting diodes are disposed below the mirror reflective element.

* * * * *

UNITED STATES PATENT AND TRADEMARK OFFICE
CERTIFICATE OF CORRECTION

| | | |
|---|---|---|
| PATENT NO. | : 11,780,370 B2 | Page 1 of 1 |
| APPLICATION NO. | : 17/935984 | |
| DATED | : October 10, 2023 | |
| INVENTOR(S) | : Austen C. Peterson et al. | |

It is certified that error appears in the above-identified patent and that said Letters Patent is hereby corrected as shown below:

In the Specification

<u>Column 10</u>
Line 37, "indium oxide (10)" should be --indium oxide (IO)--

Signed and Sealed this
Twenty-third Day of April, 2024

Katherine Kelly Vidal
*Director of the United States Patent and Trademark Office*